(12) United States Patent
Michan

(10) Patent No.: US 11,989,010 B2
(45) Date of Patent: May 21, 2024

(54) SYSTEM AND METHOD FOR DETECTING AND MEASURING ANOMALIES IN SIGNALING ORIGINATING FROM COMPONENTS USED IN INDUSTRIAL PROCESSES

(71) Applicant: Bühler AG, Uzwil (CH)

(72) Inventor: Alison Michan, Lausanne (CH)

(73) Assignee: BÜHLER AG, Uzwil (CH)

( * ) Notice: Subject to any disclaimer, the term of this patent is extended or adjusted under 35 U.S.C. 154(b) by 486 days.

(21) Appl. No.: 17/425,942

(22) PCT Filed: Jan. 30, 2020

(86) PCT No.: PCT/EP2020/052330
§ 371 (c)(1),
(2) Date: Jul. 26, 2021

(87) PCT Pub. No.: WO2020/157220
PCT Pub. Date: Aug. 6, 2020

(65) Prior Publication Data
US 2022/0163947 A1     May 26, 2022

(30) Foreign Application Priority Data
Jan. 30, 2019    (EP) ..................... 19154618

(51) Int. Cl.
*G05B 19/418*     (2006.01)
*G06N 20/00*     (2019.01)

(52) U.S. Cl.
CPC ..... *G05B 19/4184* (2013.01); *G05B 19/4185* (2013.01); *G05B 19/41865* (2013.01); *G05B 19/4188* (2013.01); *G06N 20/00* (2019.01)

(58) Field of Classification Search
CPC ............ G05B 19/4184; G05B 19/4185; G05B 19/41865; G05B 19/4188; G05B 23/0294; G05B 23/0281; G05B 23/024; G05B 23/0235; G05B 23/027; G06N 20/00; Y02P 90/80
See application file for complete search history.

(56) References Cited

U.S. PATENT DOCUMENTS

| 2011/0288836 | A1 | 11/2011 | Lacaille et al. |
| 2016/0371600 | A1* | 12/2016 | Svensen ................... G06N 7/01 |
| 2022/0157136 | A1* | 5/2022 | Metzler .............. G08B 13/1968 |

OTHER PUBLICATIONS

International Search Report and Written Opinion dated Apr. 15, 2020, received for PCT Application PCT/EP2020/052330, Filed on Jan. 30, 2020, 14 pages.

\* cited by examiner

*Primary Examiner* — Charles Cai
(74) *Attorney, Agent, or Firm* — XSENSUS LLP

(57) ABSTRACT

Anomalies are detected in sensory data originating from components used in industrial processes. The anomaly detection includes obtaining process and alarm/fault data from a component or group of components, learning typical frequency of abnormal operation or alarm/faults, comparing new data to the learned normal operation, and identifying the data as anomalous based on a threshold value which can be tuned. Automated and efficient alarm monitoring, detection and visualization are provided.

11 Claims, 24 Drawing Sheets

11.11.2017

12.11.2017

| Name | Description | | Total Duration |
|---|---|---|---|
| A_4044_BLH01 | Vibrosiebmaschine u. Kleieputzmaschinen | Kleieputzmaschine Passage KS3 | Aufstausonde zu KS3 | 0 days 14:06:00 |
| A_4025_BLH01 | Vibrosiebmaschine u. Kleieputzmaschinen | Kleieputzmaschine Passage KS1 | Aufstausonde-zu KS1 | 0 days 12:06:00 |
| FI_M211_WARN | Motorenschrank Äœberwachung | Fehlerstrommessung 150mA +M211 - Warnung | | 0 days 09:27:00 |
| A_4049_BLH03 | Aspiration Premium Mehle | Aspiration Premium Mehle | Niederdruckfilter- Aufstausonde | 0 days 08:54:00 |
| A_4052_MXZ01 | Pneumatik Regelung Premium Mehle | Leistungs- Äœeberwachung Mehle Pneumatic | | 0 days 05:12:00 |
| A_2005_BQS07 | Austrag Schnecken Zellen 201, 203, 205, 207 | Schneckerfoerderer unter Zelle 201, 203, 205,207 | Schneckenfoerderer- Ueberlauf | 0 days 03:24:00 |
| A_4068_KCU21_Alarm | MYRG Sensor Control mit MYHB Kamera | MYHB Kamera Mehl 1 Premium-Mehle, Alarm | | 0 days 02:42:00 |
| A_4011_BLH32 | Walzenstehle Mehle Premium | Walzenstuhl MDDR 3. Schrot / Äœebg. Premium Mehle | MDDR Walzenstuhl- Auslauf, Passage 3.Schr. | 0 days 02:27:00 |
| A_4011_BLH37 | Walzenstehle Mehle Premium | Walzenstuhl MDDR 3. Schrot / Äœebg. Premium Mehle | MDDR Walzenstuhl- Auslauf, Passage Äœebg. | 0 days 02:27:00 |
| A_4010_BLH32 | Walzenstehle Mehle Premium | Walzenstuhl MDDR 1. A.a. / 1.A.b. Premium Mehle | MDDR Walzenstuhl- Auslauf, Passage 1.A.a. | 0 days 02:12:00 |

Fig. 8a

| Name | Description | | Total Duration |
|---|---|---|---|
| A_4015_BRE05 | Plansichter | Plansichter-Ueberwachung, Auslauf | 1 days 03:12:00 |
| A_4052_MXZ01 | Pneumatik Regelung Premium Mehle | Leistungs-Åeberwachung Mehle Pneumatic | 0 days 22:24:00 |
| A_4049_BLH03 | Aspiration Premium Mehle | Aspiration Premium Mehle Niederdruckfilter-Aufstausonde | 0 days 21:39:00 |
| A_4031_BLH01 | Vibrosiebmaschinen Vibrosiebmaschine u. | Vibrosiebmaschine Passage KS2 Aufstausonde-zu KS2 | 0 days 17:12:00 |
| A_4044_BLH01 | Kleieputzmaschinen Vibrosiebmaschine u. | Kleieputzmaschine Passage KS3 Aufstausonde zu KS3 | 0 days 14:54:00 |
| A_4025_BLH01 | Kleieputzmaschinen | Kleieputzmaschine Passage KS1 Aufstausonde-zu KS1 | 0 days 13:30:00 |
| A_4015_BRE02 | Plansichter | Plansichter-Ueberwachung, Auslauf | 0 days 13:21:00 |
| A_4059_BLH01 | Mehltransport Mehl 1 zu Zellen | GeblÅssestrang Mehl 1 zu Kleinplansichter | Schleuse-Entlueftungseinlauf, Linie 3 |
| | | | 0 days 10:51:00 |
| A_4078_BQS07 | Kleie Transport zu den Fertigprodukten | Schneckerfoerderer Kleie Mehle Premium | Schneckenfoerderer-Ueberlauf |
| | | | 0 days 10:12:00 |
| A_4015_BRE03 | Plansichter | Plansichter-Ueberwachung, Auslauf | 0 days 09:39:00 |

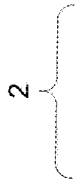

Fig. 8b

RootCause Insights – Alarms Frequency, Correlations, Anomalies

- Correlations between alarm events
- Visualization of alarm events in time
- Anomaly detection of abnormal downtime/alarms
- Alarm playback

Fig. 16

SYSTEM AND METHOD FOR DETECTING AND MEASURING ANOMALIES IN SIGNALING ORIGINATING FROM COMPONENTS USED IN INDUSTRIAL PROCESSES

REFERENCE TO RELATED APPLICATIONS

The present application is the United States national stage of PCT International Patent Application No. PCT/EP2020/052330, filed Jan. 30, 2020, which claims the benefit of European Patent Application No. 19154618.3, filed Jan. 30, 2019, the disclosures of which are hereby incorporated by reference in their entireties into the present disclosure.

FIELD OF THE INVENTION

The present invention relates to industrial process control and/or monitoring systems. In particular, the invention relates to a method for detecting anomalies or early indications of equipment failure in industrial equipment or production plants by monitoring measuring data and/or process parameters originating from components used in industrial processes according to claim 1, respectively the invention relates to a system for detecting anomalies or early indications of equipment failure in industrial equipment or production plant by monitoring measuring data and/or process parameters originating from components used in industrial processes according to claim 15. The invention comprises a self-adaptive closed-loop and/or open-loop control apparatus for the automated closed-loop and/or open-loop control of milling and roller systems, more particularly mill plants having a roller frame, but also mill systems and milling plants in general. Apart from its application to control apparati for the control and steering of milling and roller systems, the present invention also relates generally to systems and methods for detecting and measuring of anomalies in signaling originating from components used in industrial processes. Possible applications of the apparatus according to the invention also relate to milling and roller systems with real-time or quasi-real-time measurement and monitoring of operating parameters, such as roller temperature, roller gap, roller speed, roller pressing force and/or power draw of one or various roller drives, and/or with real-time or quasi-real-time measurements of ingredients or quality parameters during the production conditioning and processing in the cereal mill plants for the purpose of process monitoring (measuring, monitoring) and open-loop and/or closed-loop control of the plants and processes, such as e.g. measured variables such as water content, protein content, starch damage, ash content (mineral substances) of flours (or milling intermediates), residual starch content, milling fineness etc.

BACKGROUND OF THE INVENTION

In industrial processes and device settings, control systems are used to monitor, control, steer and signal facilities, plants or other equipment and operation/processes of industrial or chemical processes, and the like. Typically, the system that performs the controlling and monitoring uses field devices distributed at key locations in the industrial process coupled to control circuitry by a process control loop. The term "field device" refers to any device that performs a function in a distributed control or process monitoring system, including all devices used in the measurement, as e.g. sensors and measuring devices, control, monitoring and signaling of industrial processes and processing facilities. Each field device can e.g. comprise communication means, and circuitry used for communicating, in particular wired or wireless communication, with a process controller, other field devices, or other circuitry, over the process control loop. In some installations, the process control loop is also used to deliver a regulated current and/or voltage to the field device for powering the field device. The process control loop also carries data, either in an analog or digital format. Typically, field devices are used to sense or control process variables in an industrial process and/or in specific installations, if required, to monitor the local environment of the field device.

One of the technical problems of such systems is based in the fact, that controlling and monitoring of large-scale industrial assets (e.g. in grain mills, food-processing plants) typically generates large amounts of process and alarm/fault data. It is often the case that many alarms/faults are being triggered which, however, are often ignored or turned off in order to keep the process and the controlling running. Moreover, alarms/faults can be triggered by simple maintenance events on machines and are of no further technical concern. In addition, process data from, for example, motor currents, can show atypical values based on thresholds frequently and are not always cause for concern for individual events. There is a need to provide an automated distillation of alarm/fault signaling into a short-list of important events that are anomalous from typical operation. This short-list would enable effective preventive maintenance and root cause analysis of downtime events which are very expensive in industrial processes and should be minimized. It is a challenge to identify the anomalous patterns in advance, so an unsupervised method is desirable.

In addition, machinery or other industrial installations, as e.g. plants, engines mills or turbines etc., are subject to failure for numerous reasons. As mentioned above, known plant or machinery failures are typically detected by sensors and, once a failure is detected, the failure is reported to an operator for correction or signaled to appropriate assigned alarm devices. However, conventional strategies employed for the detection of failures are typically developed based on known problems that have previously occurred in the machinery, plant or device. These prior occurrences may be determined by automatically inferring sensor profiles that correspond to known abnormal behavior associated with the particular problem. However, for problems that have never had prior occurrences, failures often come without any warning or prior indication. In such situations, the cost of repair may be significantly greater than if the failure had been detected early. Furthermore, late detection of a failure or an imminent failure may jeopardize the safety of the machinery. It is therefore desirable to provide a system and method detecting unknown abnormal behavior in machinery in an automatic and accurate manner.

In particular in grain mills and food-processing plants, anomaly detection from sensor data is an important application of data mining. Using milling production, as an example, to ensure safe and optimized milling and prevent major system failures, remote monitoring of equipment is a critical part of the production process. A key task of remote monitoring is anomaly detection, i.e., to detect early indications of failures before their occurrence. For example, roller pressure and roller temperature are key components to ensure stable production, and for this reason are monitored. In the prior art, much effort has been devoted to automating anomaly detection, but it is still a very challenging task. There are several technical challenges, as partially already discussed above. Sensor data, such as temperature, pressure, displacement, flow rate, vibration, etc., is noisy, sensor values may change discontinuously, and the correlational structure can change even on a daily basis. There is a need to incorporate an intelligent monitoring and detection system and method to automatically cope with unwanted noise. Variable and multiple dependencies matter, thus, variables should not be analyzed separately, as this may generate false alerts. In addition, the system being monitored is frequently unstable, as operating conditions may change over time, e.g. environmental condition as air pressure or relative air moisture/local air humidity. Thus, there is also a need for diagnostic information such as which variables exhibit anomalies. However, prior art methods typically are known to have serious problems in practice and cannot both handle multiple operating modes and multivariate variable-wise anomaly scoring. Most systems cannot effectively provide variable-wise information, which is particularly problematic in many industrial applications, where measuring parameter dimensionality typically may be large.

US 2011/288836 reveals a method and system for detecting anomalies in an aeroengine. The method and system define a behavior model of a controller of the aeroengine using a time regression modeling the behavior of the controller as a function of a data set relating to the controller and including measurements of past behaviors and command and state measurements of the controller; continuously recalculate the behavior model for each new data set; and monitor statistical variation of the behavior model to detect a behavior anomaly of the controller representing an operating anomaly of the engine. US 2016/371600 A reveals systems and methods for monitoring data recorded from systems over time. The techniques described herein include the ability to detect and classify system events, and to provide indicators of normal system operation and anomaly detection. The systems and methods of the present disclosure can represent events occurring in the system being monitored in such a way that the temporal characteristics of the events can be captured and utilized for detection, classification and/or anomaly detection, which can be particularly useful when dealing with complex systems and/or events. US 2017/139398 reveals a plurality of production facilities and an analysis apparatus are connected through a fog network. The analysis apparatus performs a data analysis based on detection information of detectors acquired through the fog network and stores determination information relating to an abnormality of each of the plurality of production facilities or an abnormality of a production object as a result of the data analysis. Each of the plurality of production facilities determines an abnormality of the each of the plurality of production facilities or an abnormality of the production object based on the determination information stored in the analysis apparatus. EP 3 379 360 reveals an anomaly detection system 1 includes an arithmetic device 1H101 that executes processing of learning a predictive model that predicts a behavior of a monitoring target device based on operational data on the device, processing of adjusting an anomaly score such that the anomaly score for operational data under normal operation falls within a predetermined range, the anomaly score being based on a deviation of the operational data acquired from the monitoring target device from a prediction result obtained by the predictive model, processing of detecting an anomaly or a sign of an anomaly based on the adjusted anomaly score, and processing of displaying information on at least one of the anomaly score and a result of the detection on an output device.

Finally, in prior art systems, alarm/fault messages are often logged in automation system software and control systems, where it is difficult to gain insights and see trends in the data in this log form. Therefore, operators are relying on their observations of alarm/fault events to monitor the plant health. There is a need to allow for a better output signaling and visualization of the alarm/fault messages so that operators can easily track plant operation, safety and health. The visualization would also enable other individuals such as owners and maintenance providers to gain insights and for better communication with the operators. It is important to avoid/measure plant downtime in large-scale processing plants as it represents significant revenue losses.

SUMMARY OF THE INVENTION

It is an object of the present invention to overcome the disadvantages and technical problems known from the prior art. In particular, the aim is to provide an accurate and efficient control system and method for detecting anomalies in measuring and sensory data originating from components used in industrial processes.

The system should be able to provide an automated technic to efficiently distil huge amounts of alarm/fault information into a few triggered, important events that are anomalous from typical operation. The system should be able to perform the control and monitoring process in real-time or quasi-real-time. More particularly, it is an object of the invention to provide an intelligent, self-adaptive open-loop/closed-loop control apparatus for the automated optimization and control of the milling line of a roller system that could be used to perform the milling and/or crushing in optimized and automated fashion and that increases the dependability of a mill and at the same time optimizes operation by automatically reacting to anomalies that occur.

According to the present invention, the objects of the invention can be realized and achieved by means of the elements and combinations particularly depicted in the independent and dependent claims. It is to be understood that both, the foregoing general description and the following detailed description are exemplary and explanatory only and are not restrictive of the invention as described.

According to the present invention, the above-mentioned objects for a system and method for detecting anomalies or early indications of equipment failure in industrial equipment or production plants by monitoring sensory or measuring data originating from components used in industrial processes are achieved, particularly, in that sensory and/or measuring data of components used in an industrial process are measured by means of measuring devices or sensors and equal sized time frames or time periods are identified within the received data stream of sensory and/or measuring data for time periods where the components used in the industrial process are functioning normally, the sensory and/or measuring data comprising sensory values for a plurality of measuring parameters, in that the sensory values of the plurality of measuring parameters are converted into observable binary processing codes for each of the identified, equal-sized time frames and the binary processing codes are assigned to a data store or data structure holding a sequence of storable Markov chain states, in that a multi-dimensional data structure is generated comprising a definable number of variable hidden Markov model parameter values, wherein the variable model parameters of the multi-dimensional data structure are determined by means of a machine-learning module applied to the sequence of the assigned binary processing codes, and wherein the variable hidden Markov model parameters of the multi-dimensional data structure are varied and trained by learning a normal state frequency of occurring alarm events based on the sensory and/or measuring data of the identified, equal-sized time frames, in that a plurality of probability state values are initialized and stored by applying the trained multi-dimensional data structure with said variable hidden Markov model parameter values to presampled binary processing codes having a same equal-sized time frame as the measured sensory and/or measuring data, in that a logarithmic threshold value of an anomaly score is determined by ordering logarithmic result values of the stored probability state values, and in that said trained multi-dimensional data structure with the variable hidden Markov model parameter values are deployed to monitor newly measured sensory and/or measuring data from industrial equipment or plants using the threshold value of the anomaly score to detect anomalous sensor data values that could be indicative of an impending system failure, wherein, for triggering at the anomalous sensor data values, a logarithmic result value of the probability state value of a newly measured sensory and/or measuring data is generated and compared to the stored probability state values based on said logarithmic threshold value of the anomaly score. Further there are different methods for providing binary vector distances of the effective correlation, as e.g. based on a classical hamming distance (where n=1, classical hamming distance) for a window over n rows. For vectors a and b, the distance is equal to the number of ones in a and b over windows of n rows divided by the length of a. Another method is based on Jaccard distance. $J(A,B) =1-|A\cap B|/|A\cup B|$. In an embodiment variant, the distances can be periodically generated, and an algorithm is able to detect an anomaly if the effective correlations by the example methods described above were abnormal.

It is important to note that the inventive system and method, by principle, work with and without converting the analog signal to a binary signal or code (based on thresholds). However, converting the analog signal to a binary signal or code has inter alia the advantages that time series anomaly detections typically rely on thresholds and moving averages or similar to detect anomalies. The result can be the detection of too many anomaly events due to oscillating/noisy signals (typical in industrial process). For example for time-series and anomaly detection one can adjust a threshold value to have more or less sensitivity (see FIG. 13 where anomalies are marked by grey vertical lines). In this approach, each of the events are taken where a threshold has been exceeded as a True/1 value (and False/0 otherwise) to generate a binary sequence. This allows us to look at the frequency of threshold crossings so that anomalies can be classified based on abnormal frequency. An advantage is that there is no need to worry about over-sensitivity of the threshold and oscillating/noisy industrial IoT data. Unseen these advantages of the binary conversion, it is also possible to use an extension of the algorithm to find anomalies in analog process data. Moving average and variance thresholds can be applied to generate a binary sequence. The anomaly detection algorithm above can then be used. The result is that the anomalies will be identified when the process is exceeding threshold values atypically. FIG. 14 shows the anomaly of process data. In FIG. 9, the binary sequence is generated based on threshold values applied to the process data. In the following step, the described anomaly detection method is applied to the binary sequence and anomalous time periods are labeled accordingly. It is important to note that the above described inventive system and method of converting the analogue signal anomalies into binary vectors and then applying the statistical HMM anomaly detection, i.e. a Hidden Markov Model (HMM) based structure according to the present invention is technically unique and not provided by any prior art system. The present invention uses HMM for anomaly detection, while the state of the art systems use a different technique to label anomalies using the HMM. In particular, prior art systems do not use a thresholding step that the present invention is using. Moreover, prior art systems do not mention converting analog signals to binary sequences which is also part of the differentiator of claim 1.

Regarding potential inventive step or obviousness objections against any of the claims, this is much more subjective than novelty and I cannot comment how the patent officers of various regions will apply their subjective decisions and local laws. While the use of HMM's surely is a well-known technique, the claims are rather specific to the applications (grain milling, etc.) and the description is rather specific of the exact implementation that is suitable for our processes. There is certainly an abundance of literature in HMM for anomaly detection, but there are no documents teaching HMM applied specifically for these types of industrial processes and not for alarms data. Moreover, scientific papers/thesis tend to be ambiguous as they don't state claims as such.

The machine-learning module can e.g. process the sequence of the assigned binary processing codes by applying a maximum likelihood parameter estimation for the training of the multi-dimensional data structure with the variable hidden Markov model parameters, wherein the elements of the sequence of storable parameter states of the Markov chain are assumed to be independent measurements of each other and wherein the model parameters of the multi-dimensional data structure are varied by maximizing the multiplied product of the probabilities in order to obtain the trained model parameters of the multi-dimensional data structure. The model parameters of the multi-dimensional data structure can e.g. be iteratively varied until a predefined convergence threshold is exceeded. For determining said threshold value of the anomaly score, an averaging process can e.g. be applied based on the different frequencies of occurring alarm events of the sensory and/or measuring data of the identified time frames. The invention has inter alia the advantage that it provides a novel method and system for automated detection of respectively triggering at anomalies in data originating from components used in industrial processes. It provides an efficient automated system for controlling and monitoring large-scale industrial assets (e.g. in grain mills, food-processing plants), which typically generate large amounts of process and alarm/fault data, which are difficult to handle.

It is to be noted, that the machine stops for each relevant alarm (e.g. violation of roller temperature limits, roller pressure thresholds exceedance etc.), independent of the anomaly detection systems according to the invention. However, the present invention provides a novel system and method for unsupervised anomaly detection, for example, associated with industrial multivariate time-series data. Unsupervised detection can, inter alia, be essential in "unknown-unknown" scenarios, where operators are unaware of potential failures and haven't observed any prior occurrences of such unknown failures. The inventive system can also provide a data quality assessment, missing value imputation, and additional or new feature generation, validation and evaluation. The present invention allows to determine unknown failures based on comparing a normal operation profile (e.g., all sensors indicting values in a normal range) with reported differences in a current state of the operation. Sensors can be associated with various measurable elements of a piece of machinery such as vibration, temperature, pressure, and environmental changes, etc. In some cases, determining unknown failures relates to discovering a failure that is about to happen (e.g., early detection). In some cases, determining unknown failures relates to early detection as well as other cases where a failure may be happened in the past but has impact to the present operation. Further, the present invention allows an efficient filtering and differentiation of alarms/faults which are triggered by simple maintenance events on machines and are not cause for concern. This also applies to process data from, for example, motor currents, which can show atypical values based on thresholds frequently and which are not always cause for concern for individual events. The present invention allows an efficient and automated distillation of alarm/fault data streamed from sensors and measuring devices into a short-list of important events that are anomalous from typical operation. This short-list provides the basis for a novel way of effective preventive maintenance and root cause analysis of downtime events which are very expensive in industrial processes and should be minimized. The invention allows to identify the anomalous patterns in advance, so that an unsupervised completely automated method is made technically possible by the invention controlling and monitoring the correct operation of the machine. Thus, the invention allows for unsupervised anomaly detection, in particular associated with industrial multivariate time-series data. Unsupervised detection is essential in "unknown-unknown" scenarios, where operators are unaware of potential failures and haven't observed any prior occurrences of such unknown failures. The invention is able to determine unknown failures compared to a normal operation or machine/engine profile (e.g., all sensors indicting values in a normal range) with reported differences in a current state of the machine/engine. Sensors may be associated with various measurable elements of a piece of machinery such as e.g. vibration, temperature, pressure, and environmental changes, etc. In some cases, determining unknown failures (e.g., evaluation) relates to discovering a failure that is about to happen (e.g., early detection). In some other cases, determining unknown failures relates to early detection as well a case where a failure has happened in the past. In addition, the present invention allows in a new way to gain insights and see trends in the sensory data and/or alarm/fault messages in this log form, which also renders redundant a continuous monitoring of the alarm/fault events by operators. The present invention also allows for a novel monitoring of alarm/fault messages so that operators can easily track plant operation and health. The novel monitoring also enables other individuals such as owners and maintenance providers to gain automated insights and for better communication with the operators. The invention allows to avoid/measure plant downtime in large-scale processing plants as it represents significant revenue losses.

In an embodiment variant, the sensitivity of the chosen time frames can e.g. be automatically tuned based on dynamic adjustments of the threshold value. This embodiment variant has inter alia the advantage, that the convergence speed by training the variable hidden Markov model parameters of the multi-dimensional data structure can be optimized.

In another embodiment variant, anomalous time frames are e.g. evaluated across many assets of same industrial process lines, wherein for triggering at the anomaly score the anomalous time frames are applied to root cause analysis of plant downtime. Further as a variant, maintenance service signaling can e.g. be generated based on said root cause analysis of plant downtime. This embodiment variant has inter alia the advantage, that is allows a robust application of the present invention across various assets and industrial process lines. Another advantage is, that this embodiment variant allows the implementation of cloud based and/or network based automated maintenance and/or service applications and signaling.

In still another embodiment variant, for determining said threshold value of the anomaly score, a frequency pattern is generated for each of the equal-sized, identified time frames using a pattern recognition to initialize a plurality of Markov chain sequences of storable parameter states, wherein each storable parameter state is a function of the plurality of the measuring parameters, wherein, by means of the applied pattern recognition, weighting factors and/or mean and/or variance of each of the plurality of sequences of storable parameter states are determined, and not relevant time frames are removed from the used set of equal-sized, identified time frames. This embodiment variant has inter alia the advantage, that the convergence speed by training the variable hidden Markov model parameters of the multi-dimensional data structure can be optimized. Thus, the pattern recognition and weighting factors allow applying a correlation anomaly measure of each variable in a noisy data sample by comparing the measured data sample with reference data, even when some of the variables are highly correlated. Therefore, spurious dependencies introduced by noise can be removed by focusing on the most significant dependencies for each variable. Neighborhood selection can e.g. be performed in an adaptive manner by fitting a sparse graphical Gaussian model as the maximum likelihood estimation. The correlation anomaly measure for each measuring parameter can then be generated by the distances between the fitted conditional distributions.

In an embodiment variant, a gating signal, as a digital signal or pulse is generated providing an appropriate time window, wherein an occurring anomalous time frame of newly measured sensory data from among the many measured time frames of measuring data are selected and normal time frames will be eliminated or discarded, and wherein the selection of an occurring anomalous time frame triggers the appropriate signaling generation and transition to assigned alarm and/or monitoring and/or control/steering devices. This embodiment variant has inter alia the advantage, that it allows an efficient inter-machine signaling by generating appropriate steering signaling controlling the operation of associated devices triggered by the detected anomalies or early indications of equipment failure in industrial equipment or production plants.

In a further embodiment variant, the above method and system for automated detection of anomalies or early indications of equipment failure in industrial equipment or production plants is applied to an intelligent, self-adaptive closed-loop and open-loop control method for a closed-loop and/or open-loop control apparatus for self-optimized control of a mill plant and/or a milling line of a roller system of the mill plant, wherein the milling line comprises a plurality of processing units that are each individually actuatable by means of the closed-loop and open-loop control apparatus and individually regulable during their operation on the basis of operative process parameters, wherein the closed-loop and open-loop control apparatus comprises a pattern recognition module based on the above method for detecting anomalies, the operation of the control apparatus being triggered by signaling of the pattern recognition module, and wherein the operation of the mill plant is steered and adapted by means of the control apparatus based on the transmitted trigger signal. As a variant, the closed-loop and/or open-loop control apparatus can e.g. comprise a batch controller having a defined processing sequence in the processing units, which is regulable by means of an operative process recipe and the control apparatus, wherein a defined quantity of an end product is producible from one or more starting materials by means of the operative process recipe, wherein the processing units are controlled on the basis of operative batch process parameters specifically associated with the operative process recipe, and wherein the operation batch controller is adapted or optimized based on one or more occurring and detected anomalous time frames of newly measured sensory data by means of the control apparatus. The control apparatus can e.g. further comprise a second pattern recognition module for recognizing operative process recipes having multidimensional batch process parameter patterns, wherein an operative process recipe comprises at least one or more starting materials, a defined sequence of a milling process within the processing units of the milling line and operative batch process parameters stored in association with respective processing units of the milling line, wherein the closed-loop and open-loop control apparatus comprises a memory apparatus for storing historical operative process recipes having historical batch process parameters, wherein the historical batch process parameters of a process recipe each define a process-typical, multidimensional batch process parameter pattern of an optimized batch process in the normal range, wherein input of a new operative process recipe results in one or more of the stored historical operative process recipes being triggered and/or selected as the closest batch process parameter pattern(s) by means of pattern recognition by the pattern recognition module on the basis of the associated multidimensional batch process parameter patterns, and wherein new batch process parameter patterns having new batch process parameters are generated by means of the closed-loop and open-loop control apparatus upon detection of one or more occurring anomalous time frames of newly measured sensory data by means of the control apparatus on the basis of the triggered closest batch normal process parameter patterns, the processing units being actuated and regulated by means of the closed-loop and open-loop control apparatus as appropriate on the basis of the generated operative process recipes having associated batch process parameters. This embodiment variant has inter alia the advantage to allow providing an intelligent, self-adaptive open-loop/closed-loop control apparatus for the automated optimization and control of the milling line of a roller system that can be used to perform the milling and/or crushing in optimized and automated fashion and that increases the dependability of a mill and at the same time optimizes operation or automatically reacts to anomalies that occur.

Note that sensors and measuring devices as field devices are used to sense or control process variables of an industrial equipment or plant in an industrial process. However, in some installations, it may be desirable to monitor the local environment of the field device. Further note, that the anomaly detection system or method can e.g. comprise an additional threshold evaluator module to store an upper threshold value and a lower threshold value per received technical status data for one or more of the respective sensor signals. The threshold evaluator compares the received technical status data with the threshold values, and generates, irrespective of the evaluation by the anomaly detection system or method, an anomaly indicator for a particular technical status data if the respective data value falls outside the interval defined by the respective upper and lower thresholds. In other words, threshold-based sensor data evaluation can provide a shortcut to the detection of an anomaly indicator. If a particular technical status data value lies outside the tolerance range defined by the upper lower thresholds immediately a corresponding anomaly indicator is detected no matter what the outcome of the anomaly detection provides. For example, the threshold values may be predefined (e.g., by an operator) based on prior experience, or the threshold values, as short cut values, may be learned by a machine learning module from historic sensor data.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

BRIEF DESCRIPTION OF THE DRAWINGS

The present invention will be explained in more detail, by way of example, with reference to the drawings in which.

Figure 1:
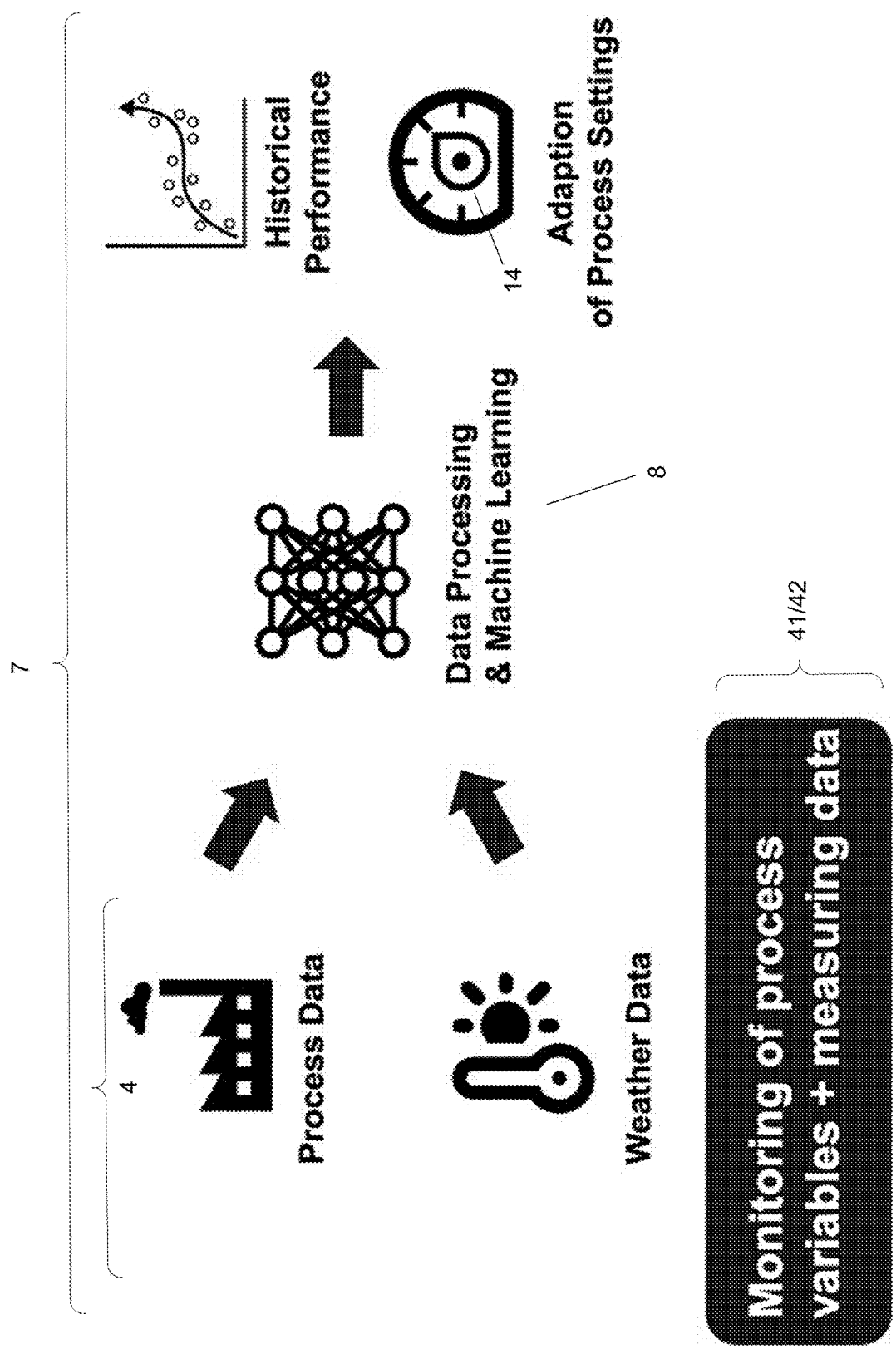
FIG. 1 shows a diagram schematically illustrating a monitoring and adaption process in an industrial plant, with an intelligent, self-adaptive control apparatus for self-optimized control of an industrial plant
Figure 2:
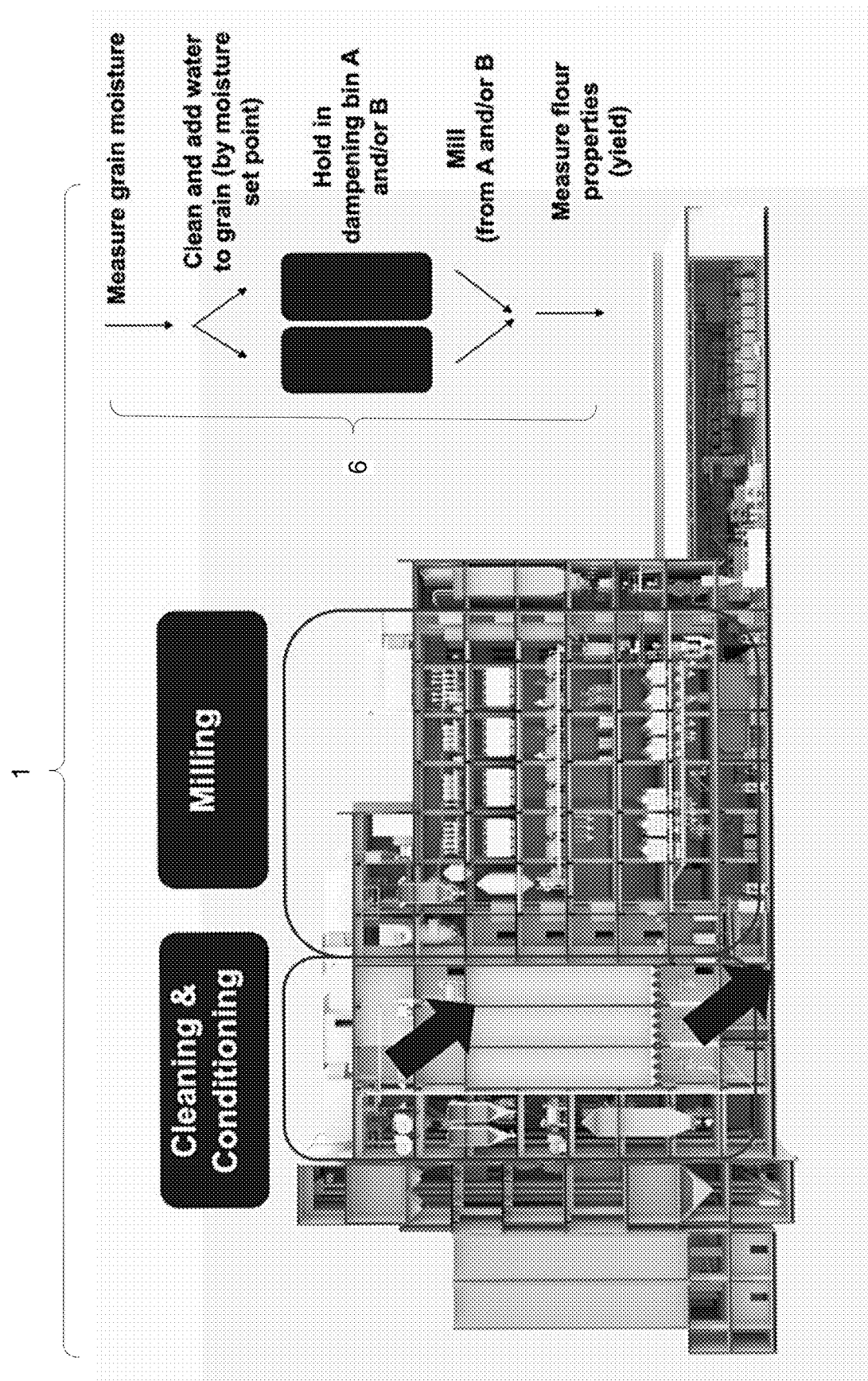
FIG. 2 shows a diagram schematically illustrating a monitoring and adaption process in an industrial plant. The data from sensors are transmitted periodically, e.g. every 3 minutes.

The FIGS. 3 to 12 illustrate plant fault/suspend events (downtime) in the premium milling section of the exemplary plant according to FIG. 2. Major fault suspends events due to mechanical errors in the milling/cleaning/first cleaning sections are illustrated in an operational status overview. Frequent faults at an individual sensor level are shown for exemplary data of 2017 and 2018, respectively. Anomalies are illustrated at the mill level section and for individual sensors. Signaling for optimization and preventive maintenance are illustrated, too.

Figure 3:
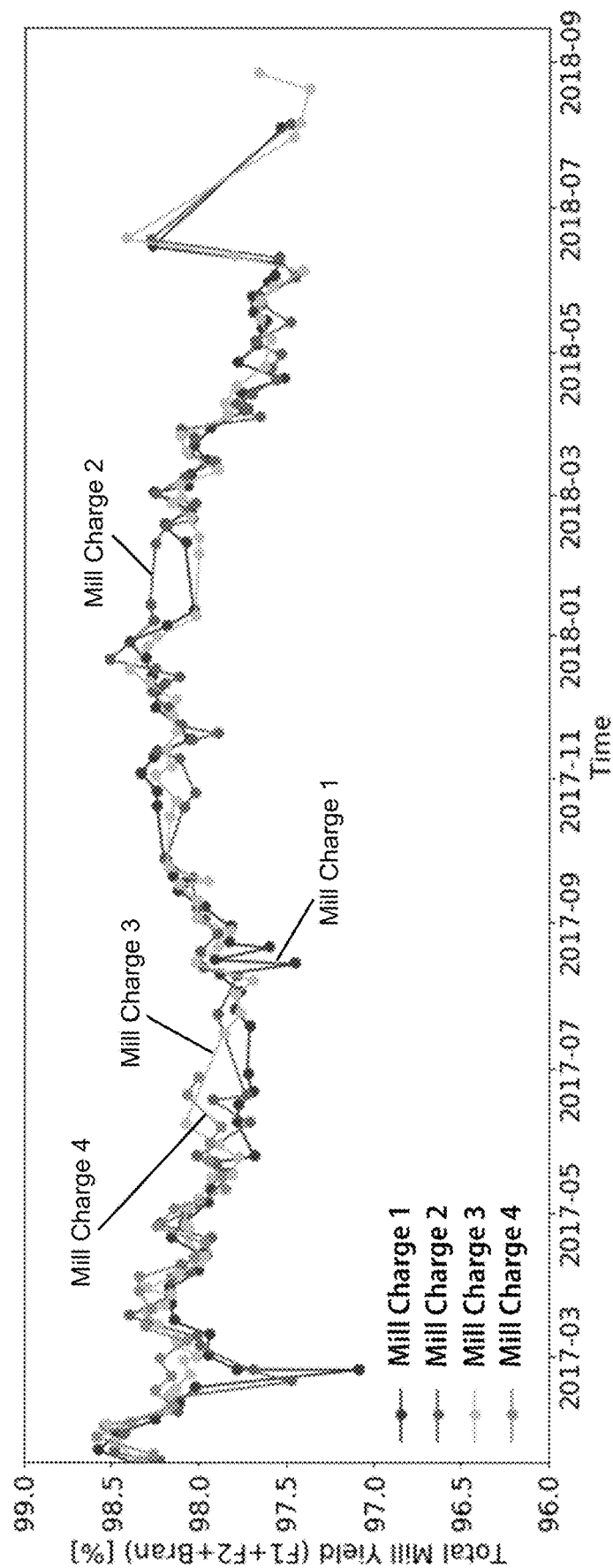

FIG. 3 shows a diagram schematically illustrating the monitoring of an exemplary mill yield in the time period of 2017 to 2018.

Figure 4:
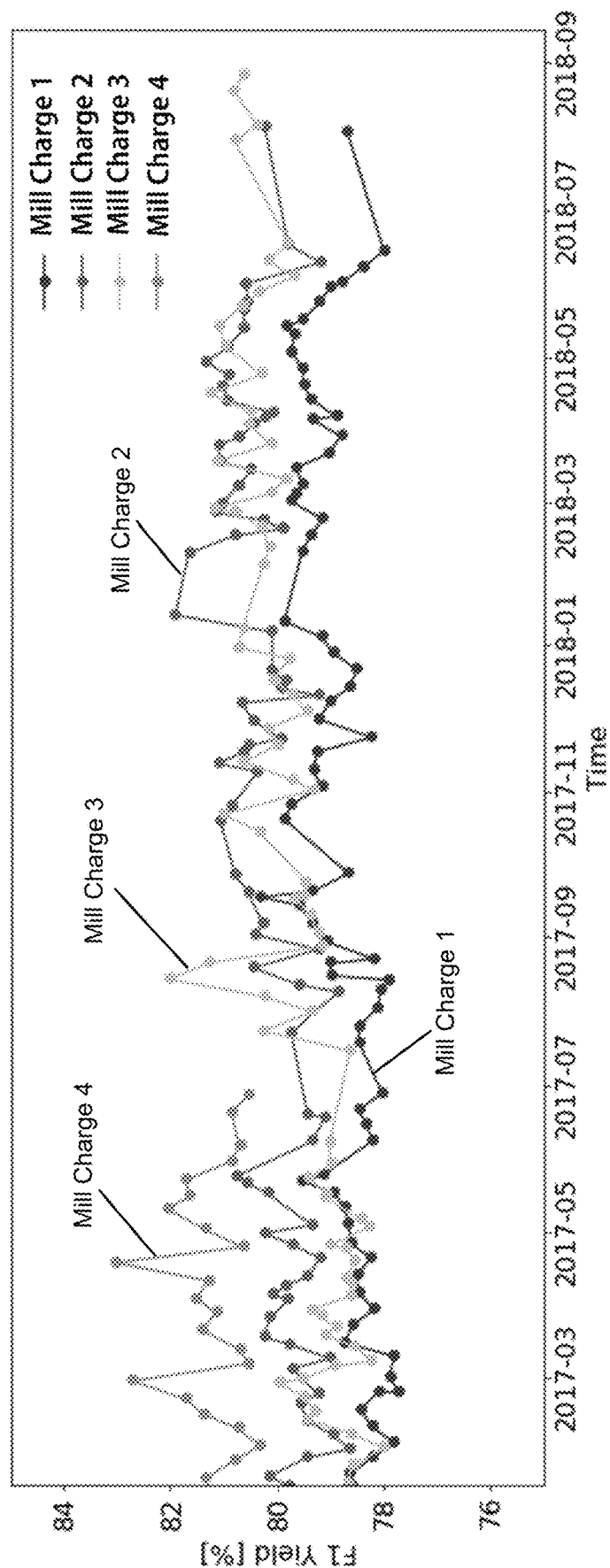

FIG. 4 shows a diagram schematically illustrating the monitoring of an exemplary F1 yield in the time period of 2017 to 2018.

Figure 5:
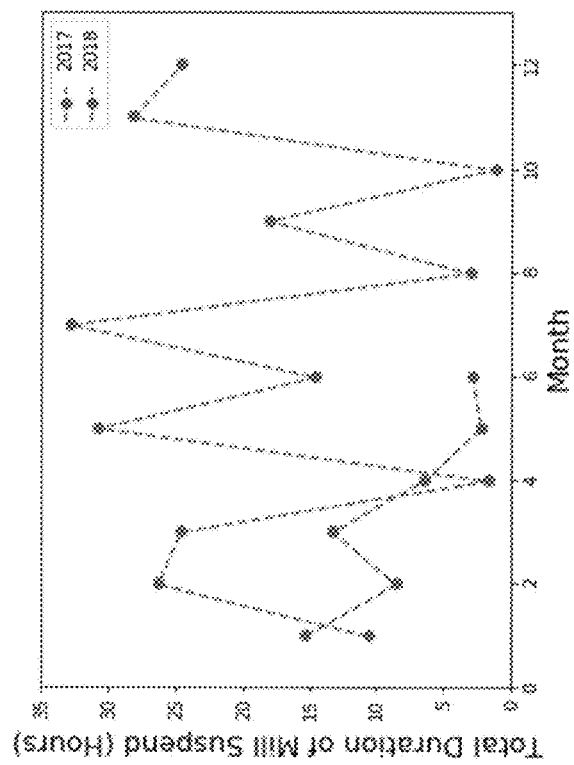
Figure 6A:
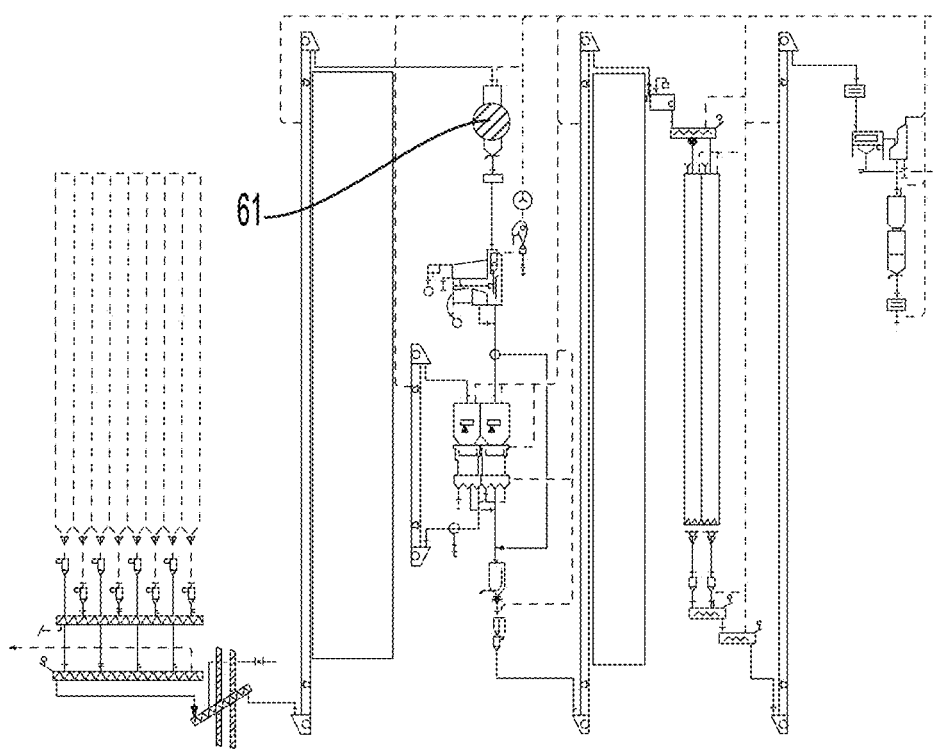
Figure 6B:
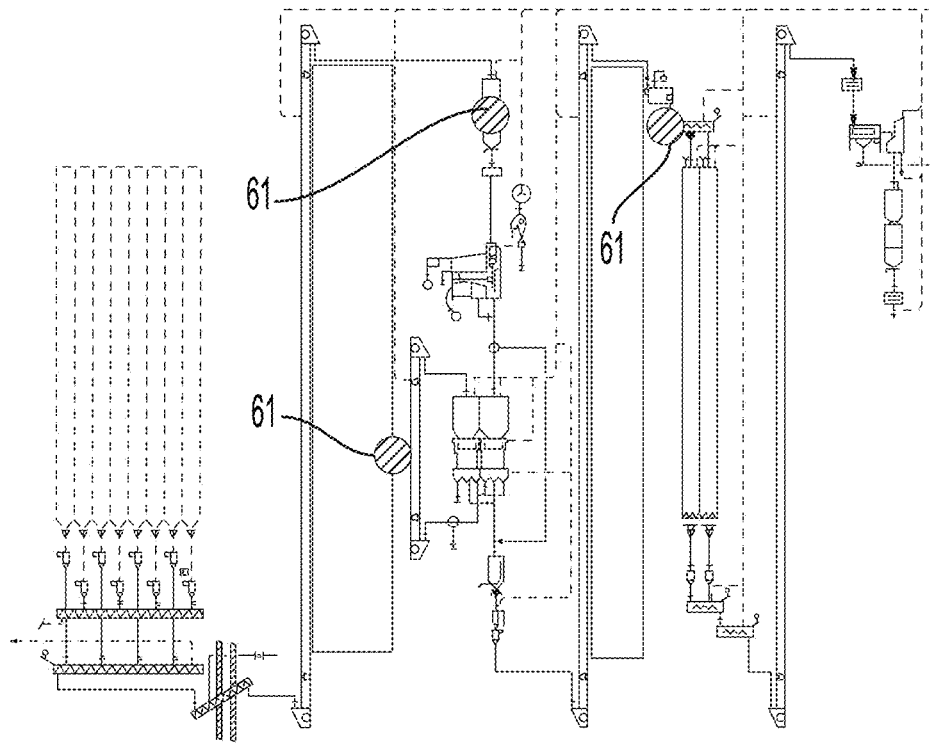
Figure 6C:
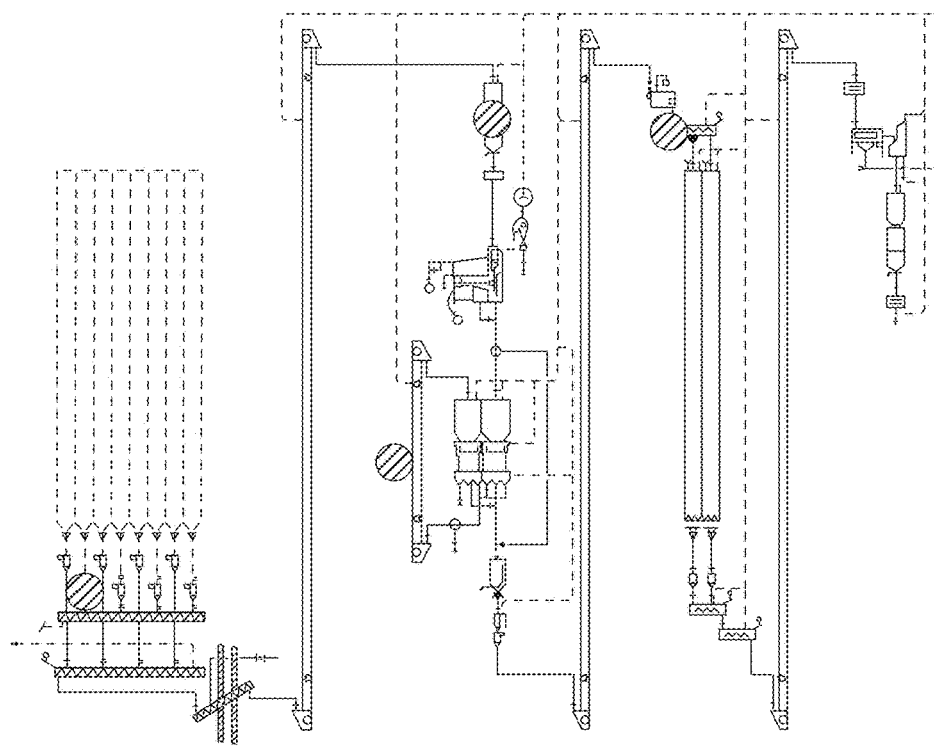
Figure 6D:
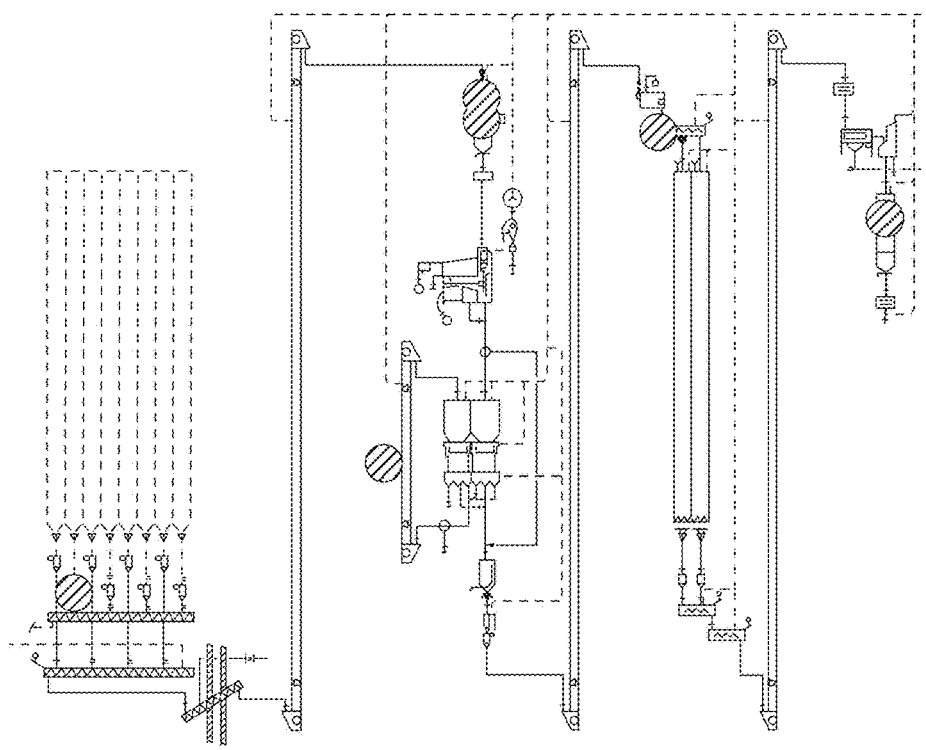
Figure 6E:
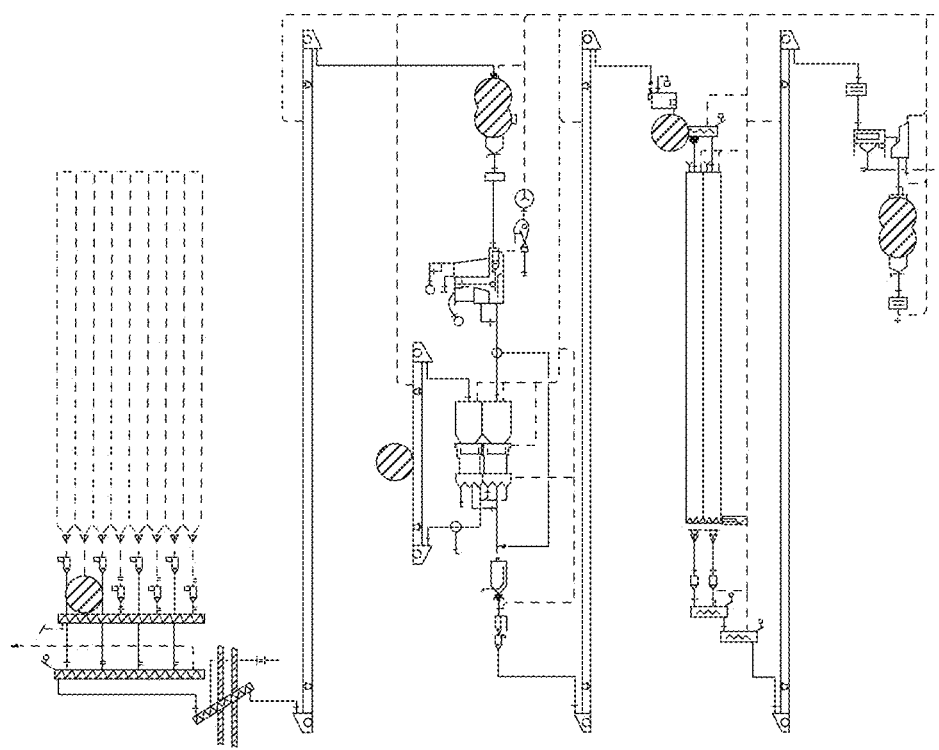
Figure 6F:
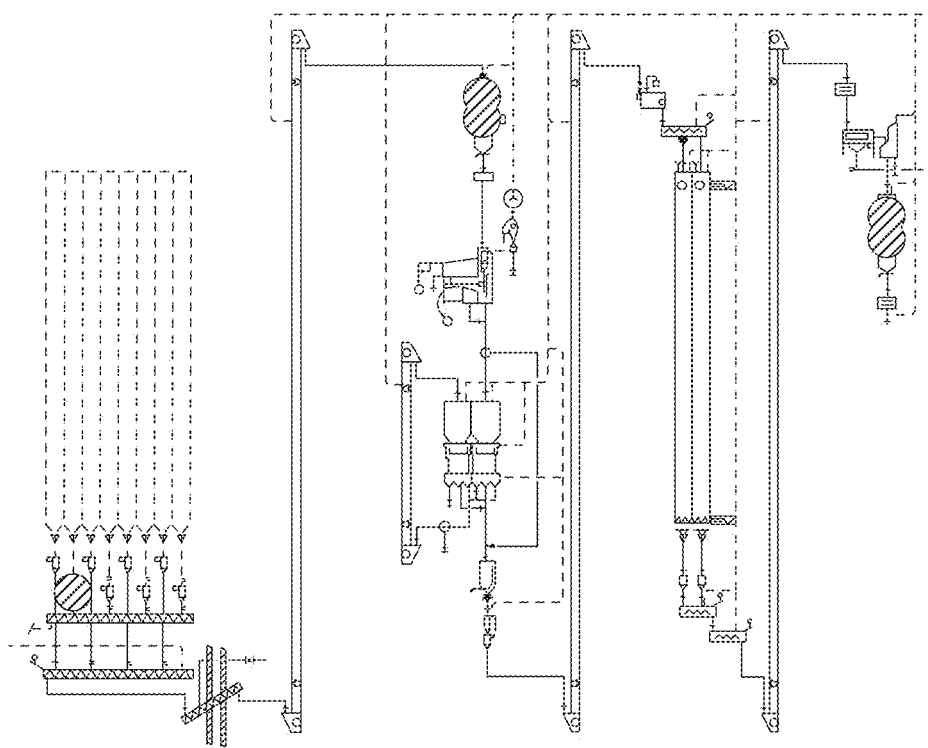
Figure 6G:
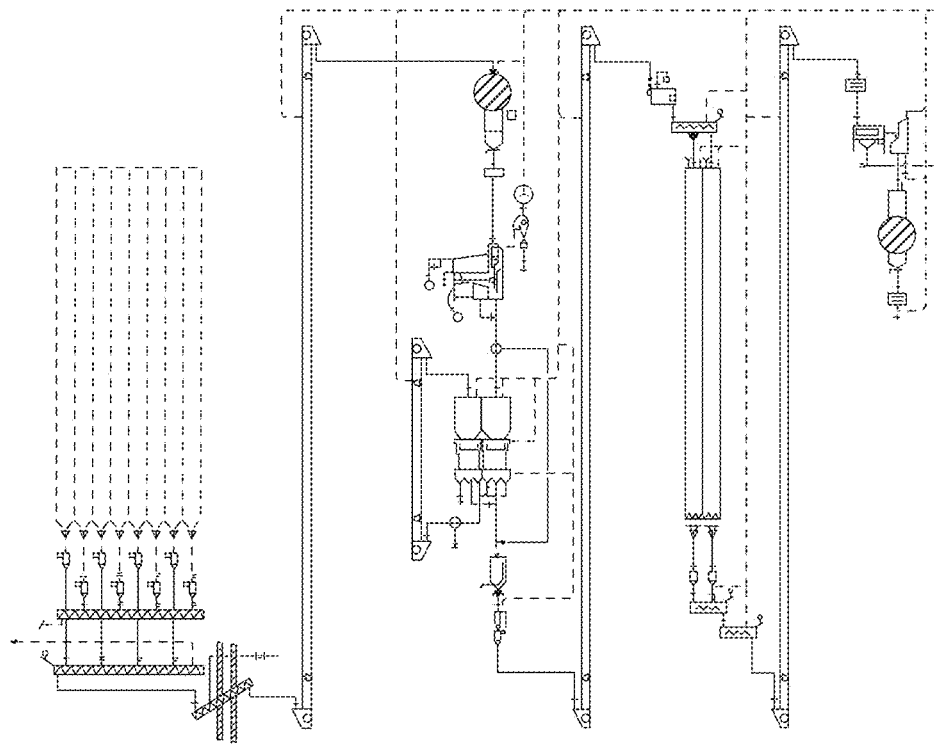
Figure 6H:
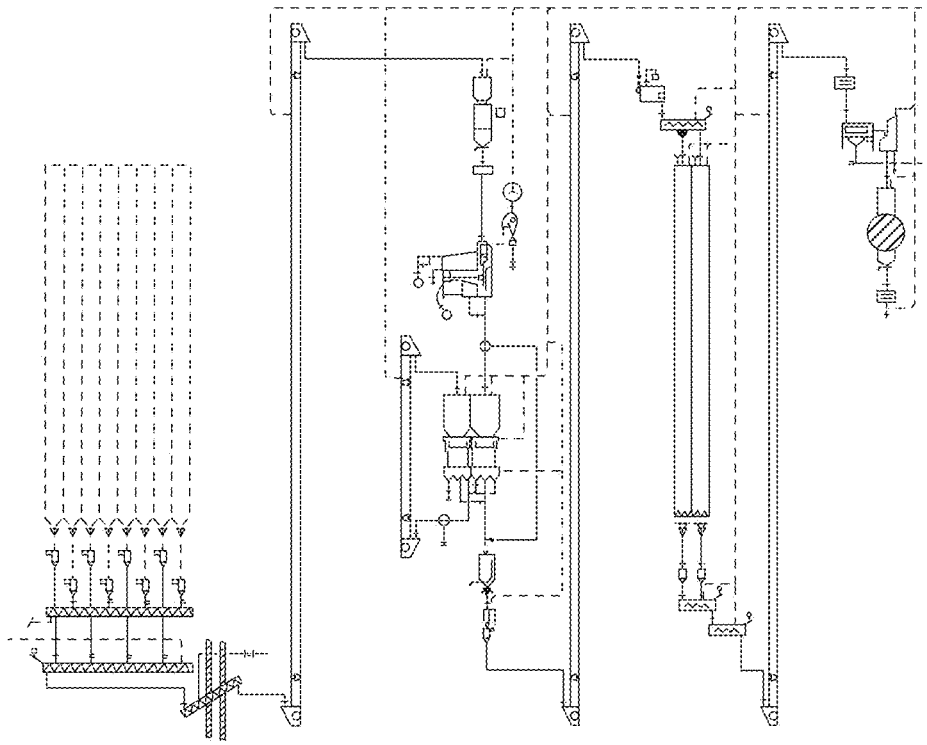
Figure 6I:
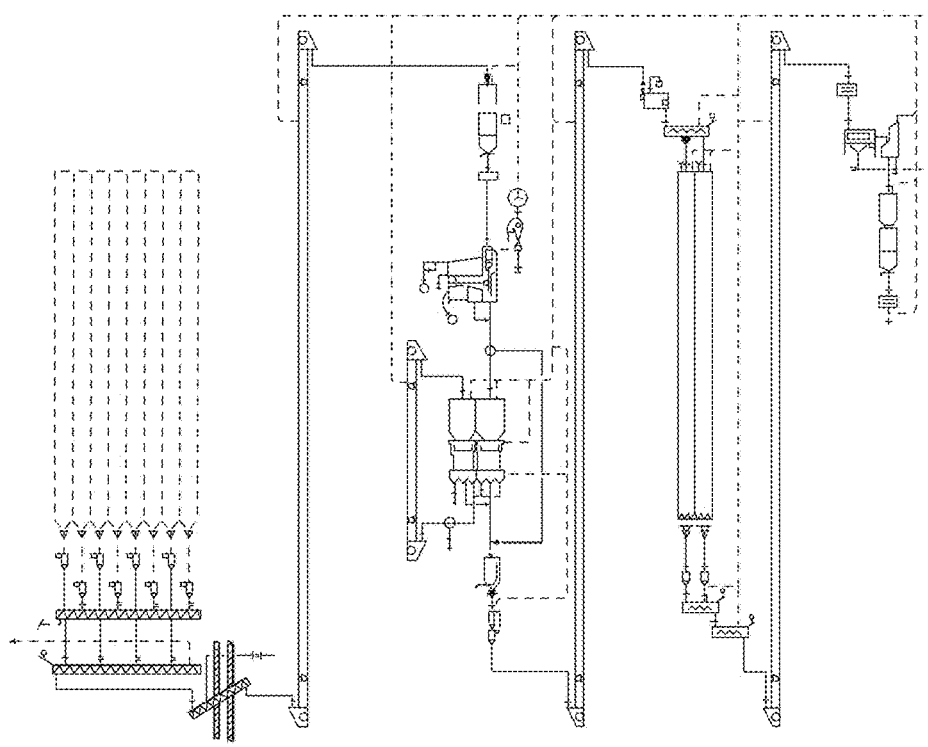
Figure 6J:
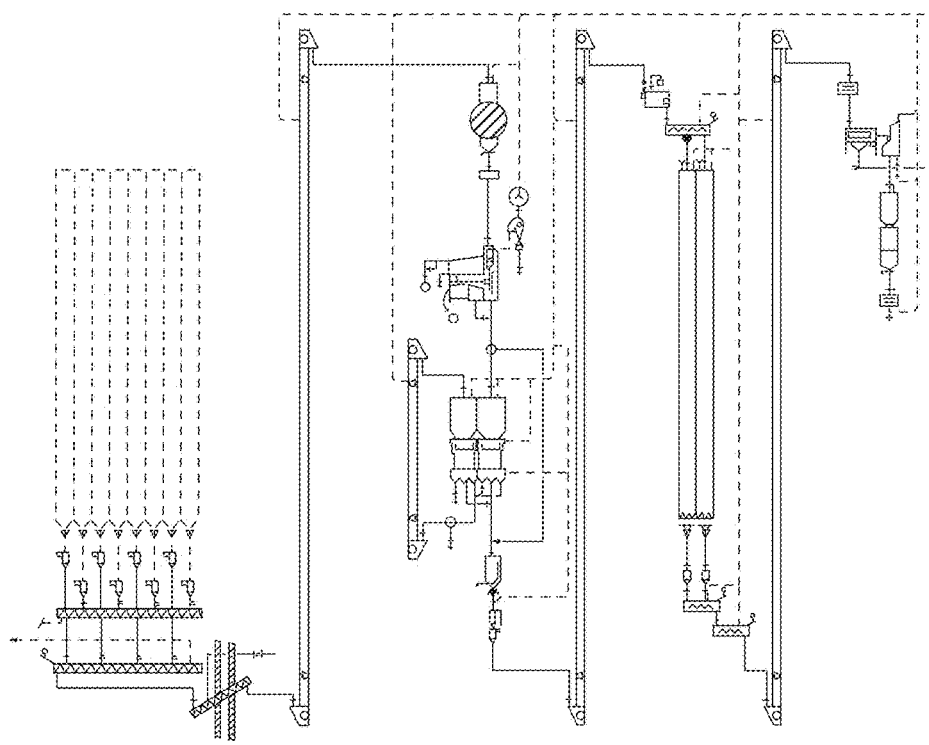
Figure 6K:
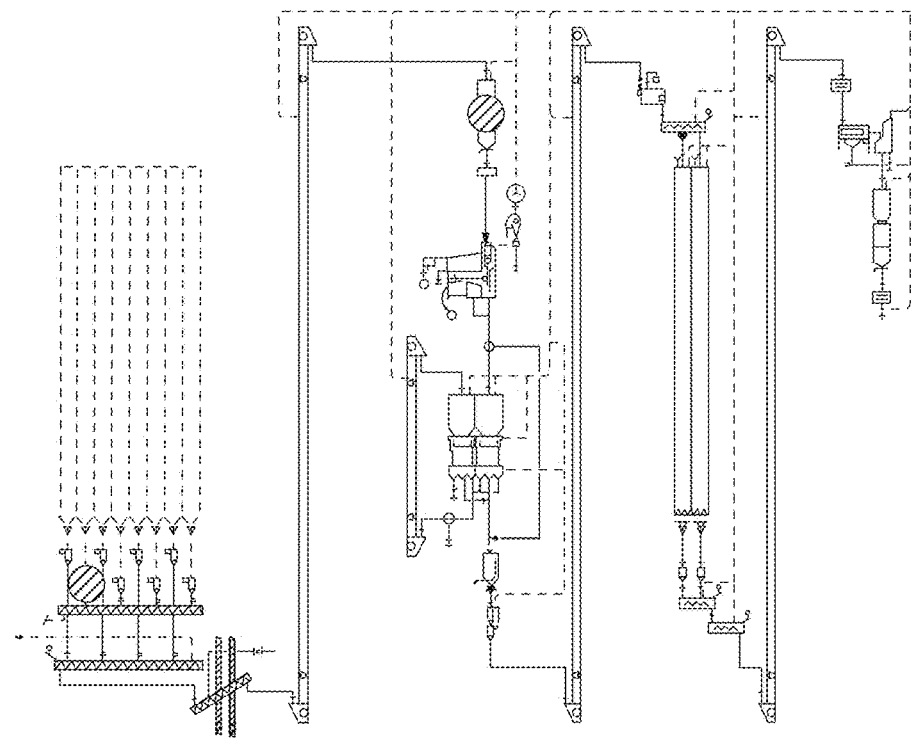
Figure 6L:
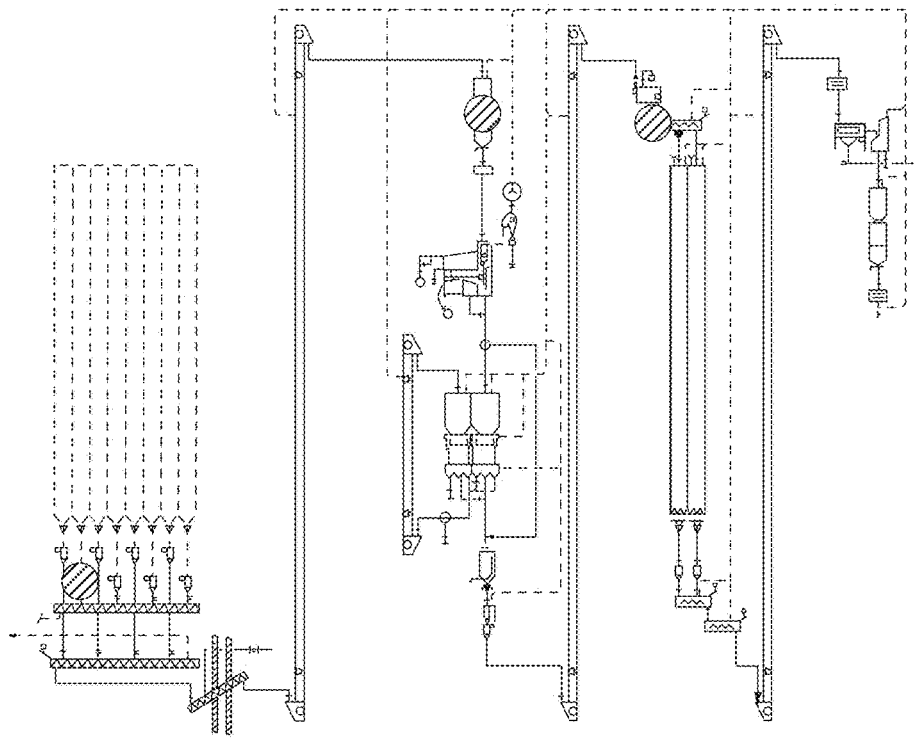
Figure 6M:
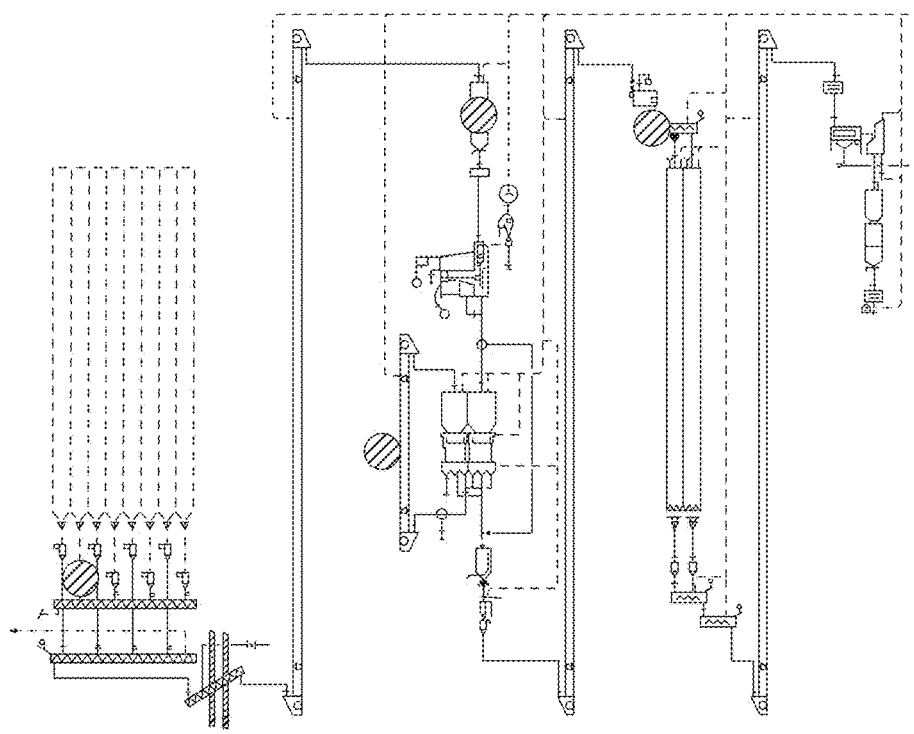
Figure 6N:
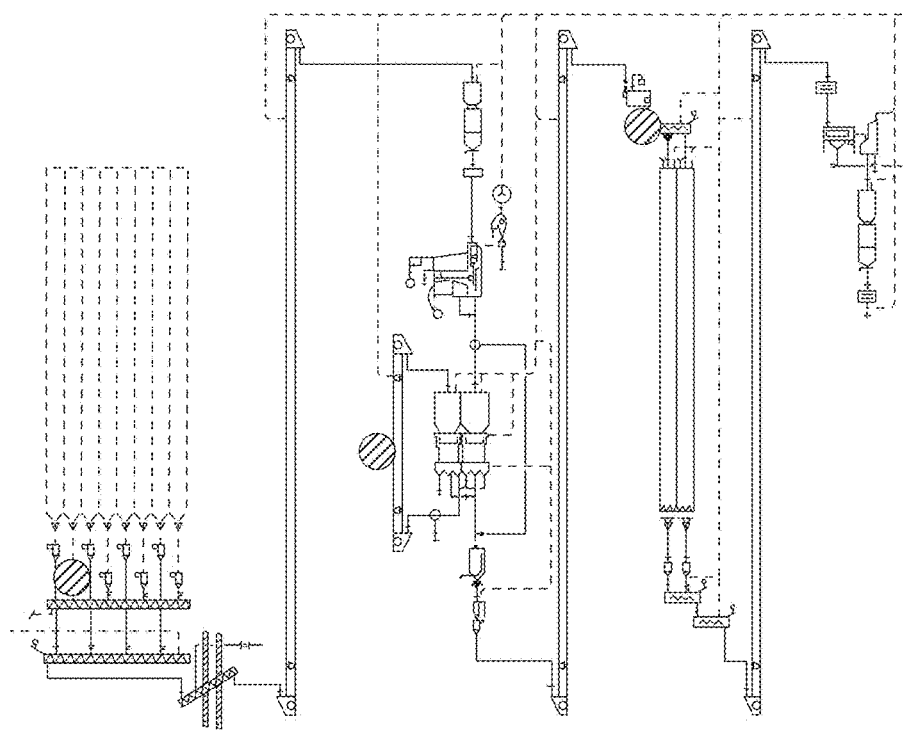
Figure 6O:
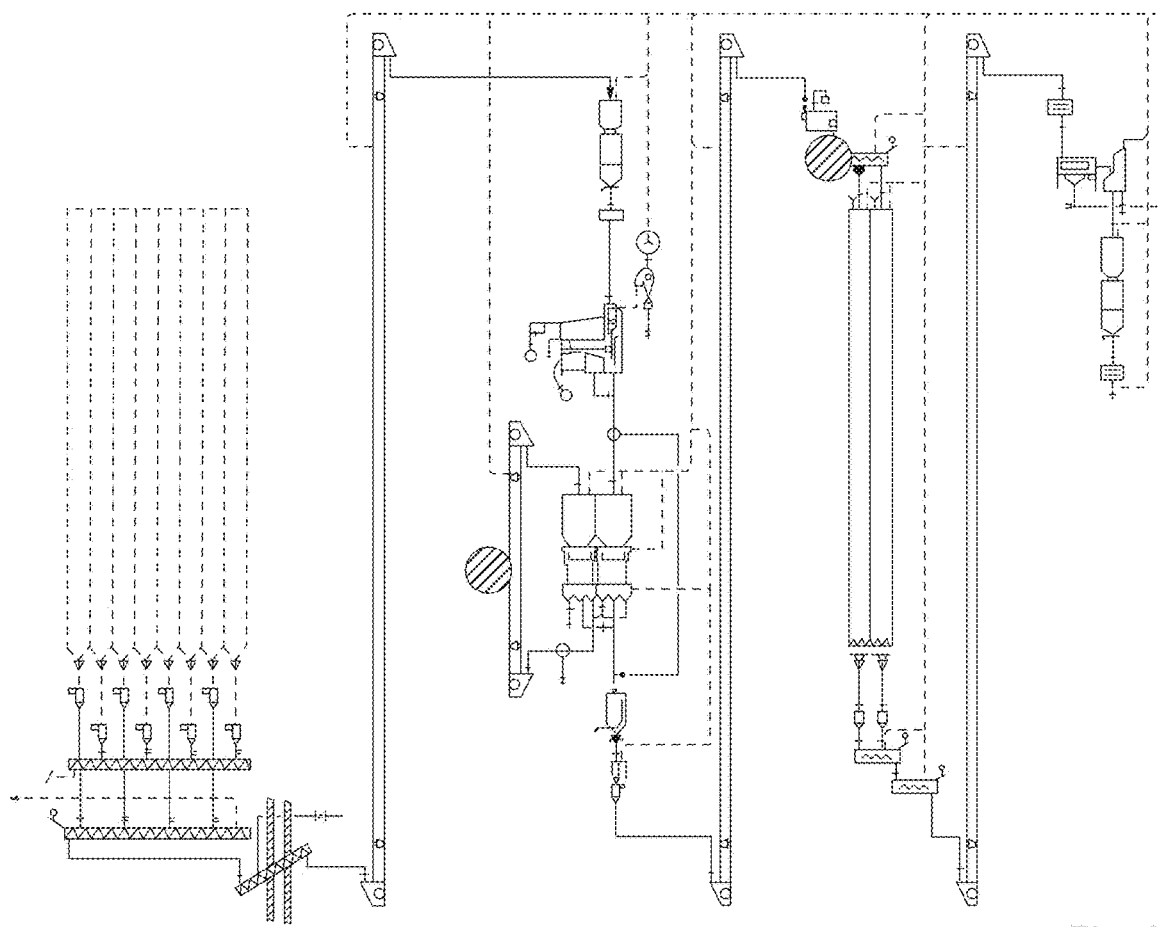

FIG. 5 shows a diagram schematically illustrating the monitoring of an exemplary milling section milling suspends summary in the time period of 2017 to 2018. The total number of suspend events in 2018 was, in this example, 80 with a total duration time of 2 days 27 h11 min. The longest suspend in the milling section was 14 h51 min on Jan. 1, 2018 The total number of suspend events in 2017 was 275 with a total duration time of 9 days 8 h 58 min. The sum excludes missing events FIGS. 6a-6o show a diagram schematically illustrating the error monitoring of the exemplary milling plant in the time period of Nov. 1 to Nov. 30, 2017.

Figure 7:
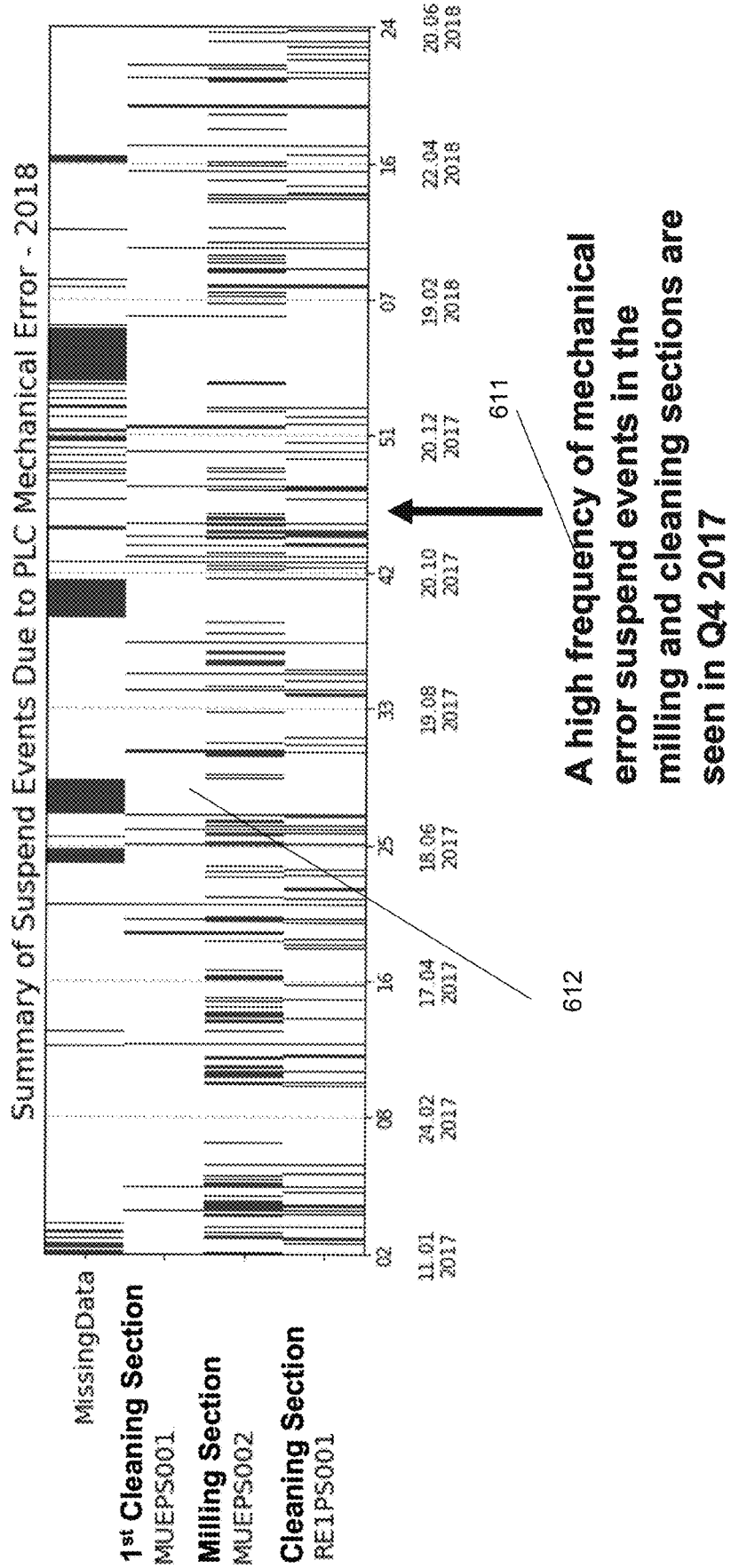

FIG. 7 shows a diagram schematically illustrating the error monitoring frequency summery of the exemplary milling plant in a time period of 2017 to 2018. The figure shows the plant suspend events for the second cleaning section (MUEPS001), the milling section (MUEPS002) and the first cleaning section (RE1PS001) mechanical error faults by week number. Missing data greater than 10 minutes are plotted above. The vertical bars indicate when faults occurred and are enlarged (by 15 h) to make visible short timescale fault events. Thicker vertical lines indicate longer fault events or several short fault events close together. Faults shorter than 3 minutes are excluded (the data is sampled every 3 minutes).

FIGS. 8a and 8b show a diagram schematically illustrating exemplary top 10 fault alarms by duration in 2018.

Figure 9:
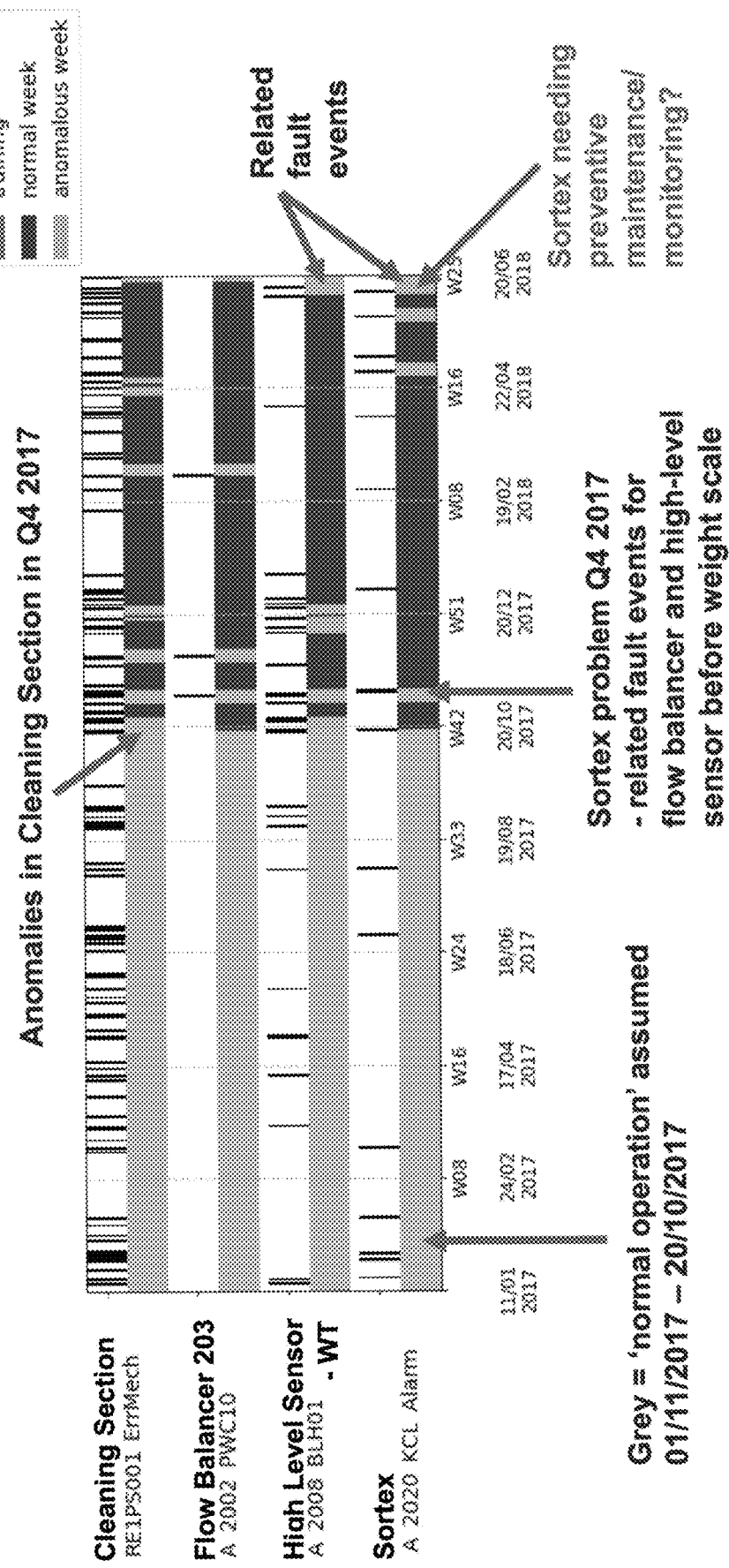

FIG. 9 shows a diagram schematically illustrating error monitoring in the cleaning section of the exemplary plant in the time period of 2017 to 2018. The inventive system and method allow generating signaling if preventive maintenance or further monitoring is needed for the sortex. The inventive anomaly detection method is able to identify equipment that requires preventive maintenance or monitoring. The plot shows some preliminary results, with abnormal weeks being labelled in orange for the cleaning section. FIG. 9 show preliminary results where abnormal fault frequencies are detected. The vertical bars indicate when faults occurred and are slightly enlarged to make visible short time-scale fault events. The color bar indicates the classification of each fault signal. The time period labelled grey is assumed to be typical plant operation. The time periods labelled blue are classified as normal operation and the weeks labelled orange are classified as anomalous. Missing data time periods are classified as normal operation and not indicated. Please, note that sortex, high level sensor—WT, flow balancer 203 and cleaning section are just examples for different machines. Thus, in FIG. 9, the sortex could also be more general referenced as "machine 1", the high-level sensor—WT as "machine 2", the flow balancer 203 as "machine 3" and cleaning section as "machine 4" of the overall system.

Figure 10:
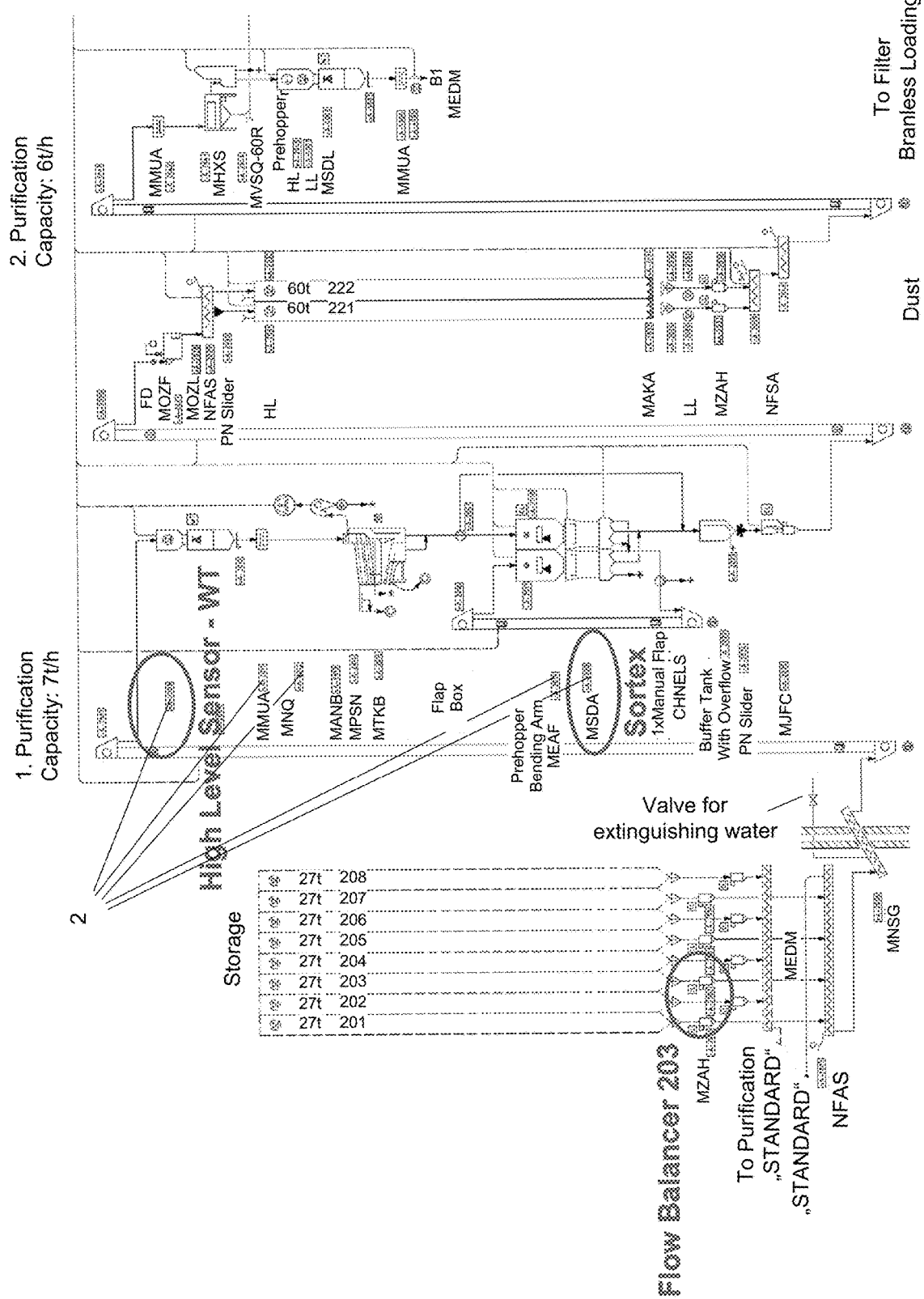

FIG. 10 shows a diagram schematically illustrating the error monitoring in the cleaning section of the exemplary milling plant by sensor location in the plant. The reference numerals having the form A-xxxx denote sensors and measuring devices capturing measuring data during operation of the cleaning section of the milling plant and are taken within various locations in the processing.

Figure 11:
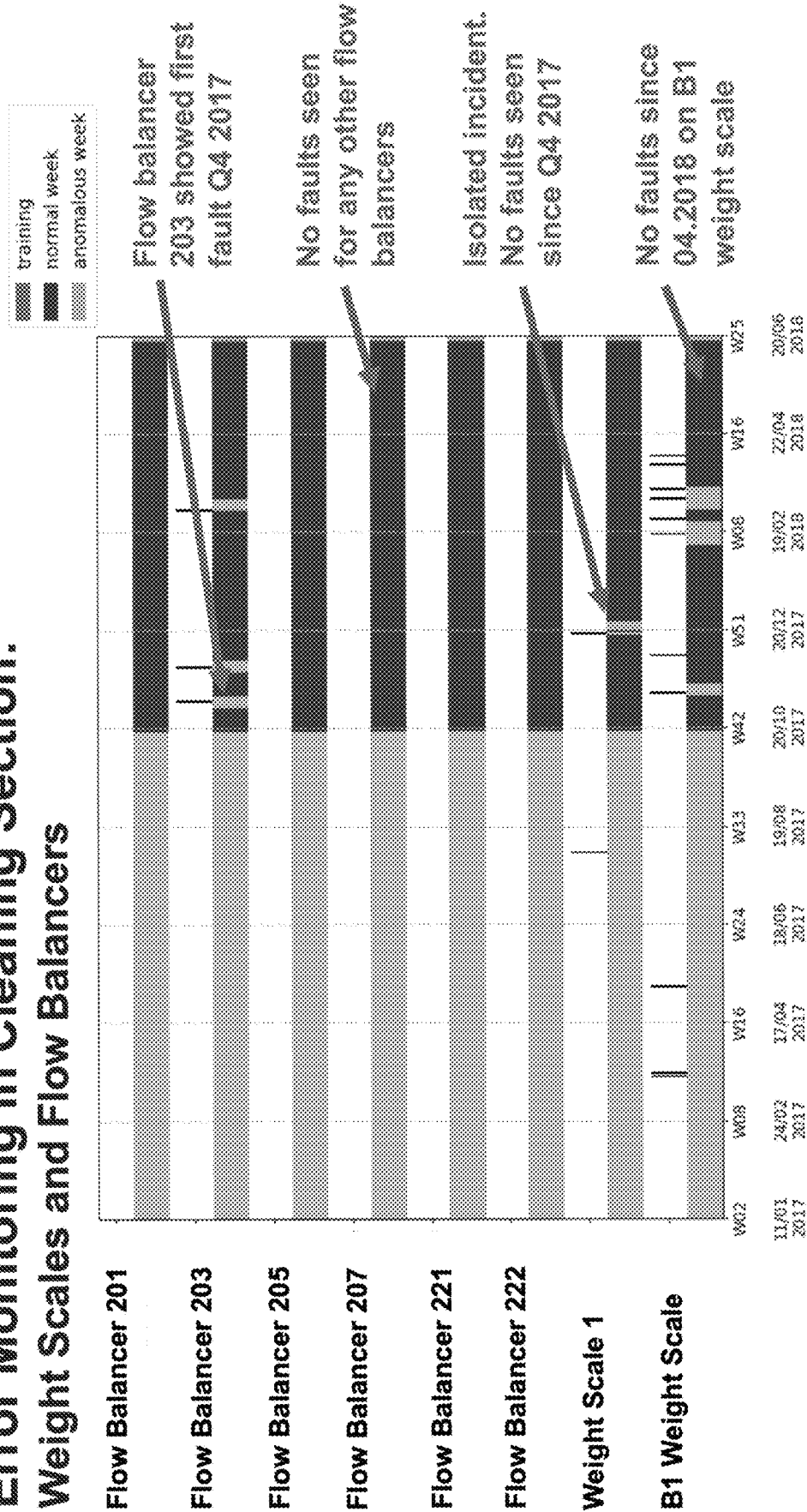

FIG. 11 shows a diagram schematically illustrating the error monitoring in the cleaning section of the exemplary milling plant by weight scales and flow balancers.

Figure 12:
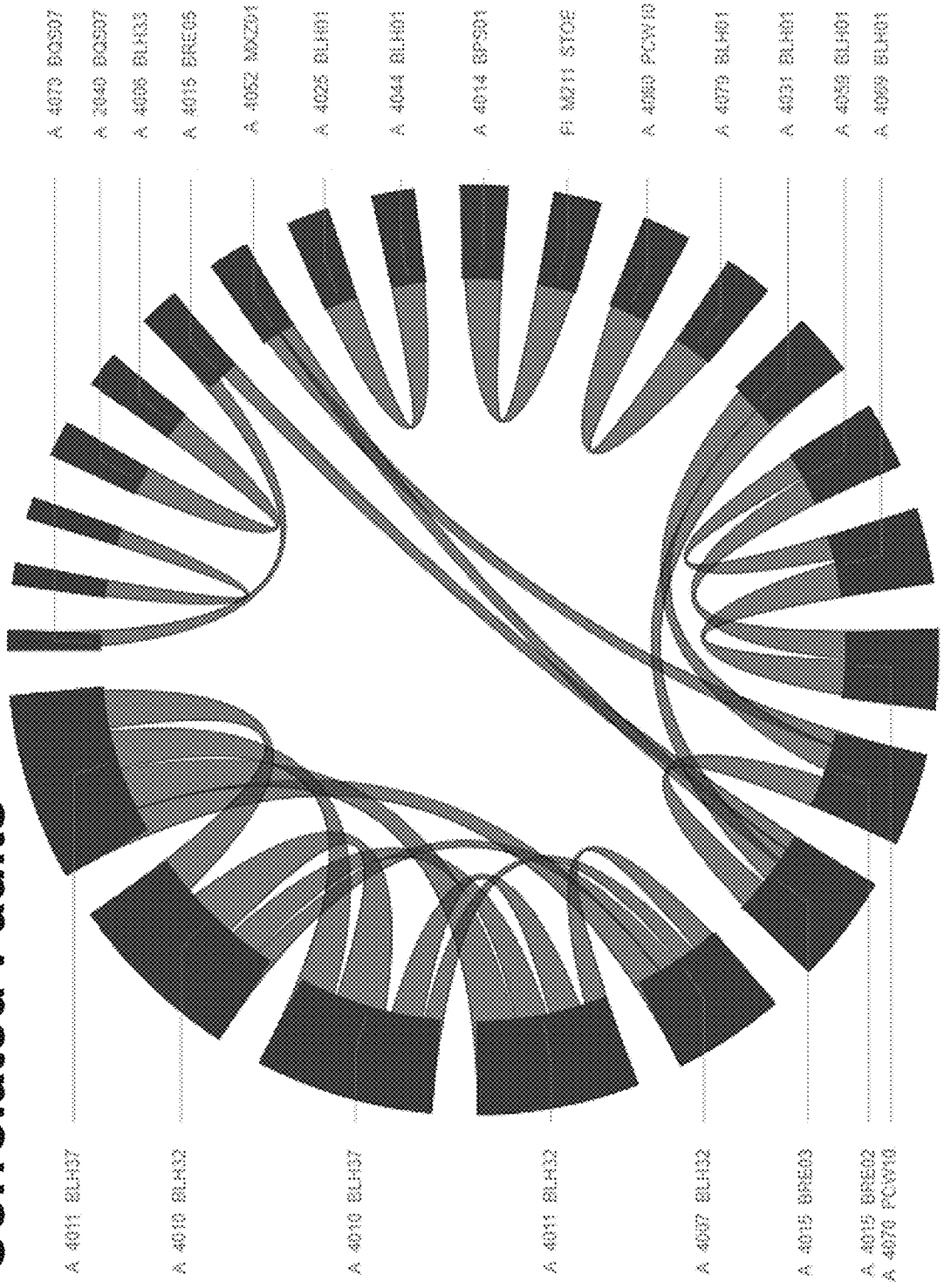

FIG. 12 shows a diagram schematically illustrating the error/fault correlation in the sensory and measuring data. The inventive system and novel method for a control apparatus detecting anomalies of the operation of the plant is capable to cope with a high number of correlation and sensory values. The chord plot of FIG. 12 shows faults occurring simultaneously, implying possible correlation between mechanical failures.

Figure 13:
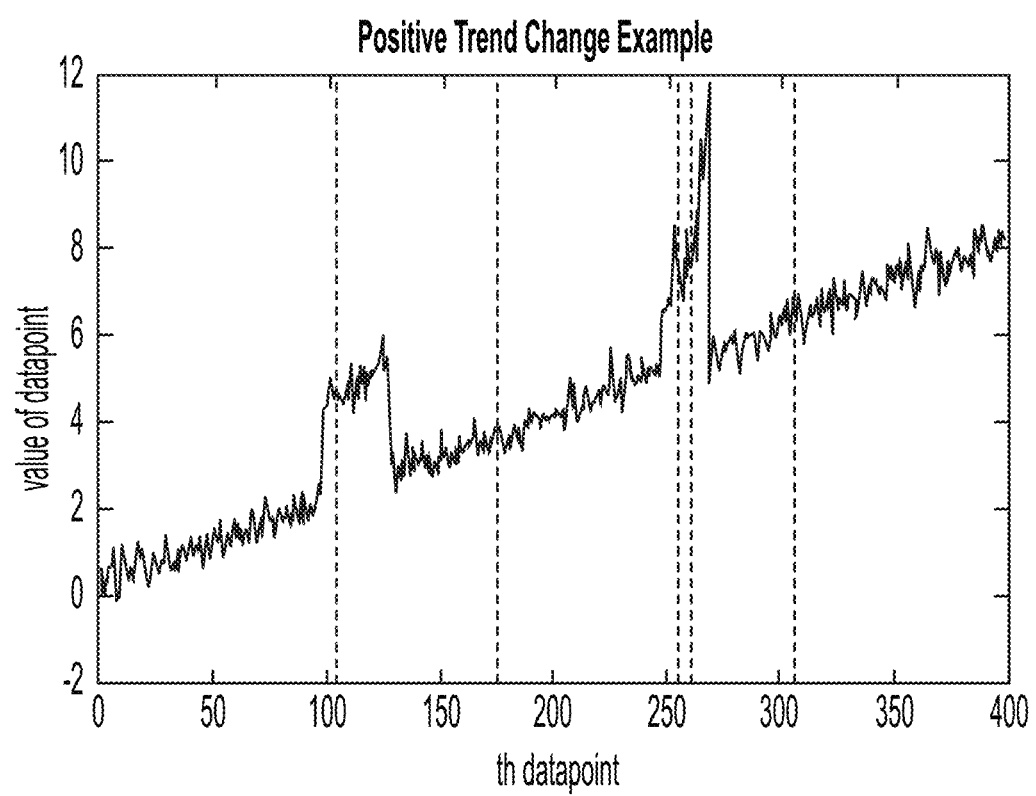

FIG. 13 shows a diagram schematically illustrating an embodiment variant of the present invention with binary conversion of the process data. Typically, time series anomaly detection algorithms rely on thresholds and moving averages or similar to detect anomalies. The result can be the detection of too many anomaly events due to oscillating/noisy signals (typical in industrial process). In the present invention, one can adjust a threshold value to have more or less sensitivity (see FIG. 13 where anomalies are marked by vertical lines). Each of the events is taken where a threshold has been exceeded as a True/1 value (and False/0 otherwise) to generate a binary sequence. This allows to look at the frequency of threshold crossings so that anomalies can be classified based on abnormal frequency. A technical advantage is that there is no need to worry about over-sensitivity of the threshold and oscillating/noisy industrial IoT data.

Figure 14:
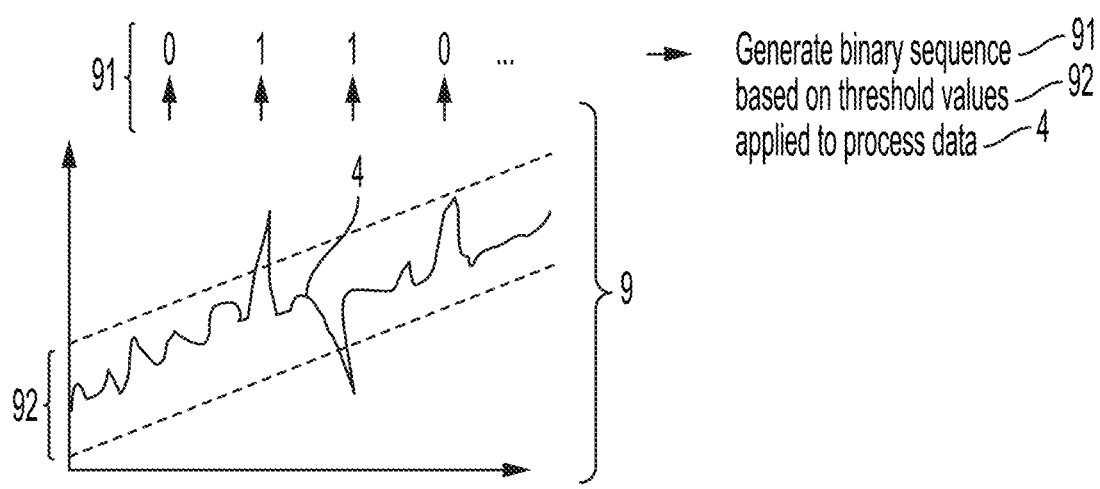

FIG. 14 shows a diagram schematically illustrating the anomaly detection of process data, where in a first step the binary sequence is generated based on threshold values applied to the process data (see FIG. 14). In a second step, the herein described anomaly detection is applied to the binary sequence and anomalous time periods are labeled, accordingly. Converting the analogue signal anomalies into binary vectors and then applying the statistical HMM (Hidden Markov Model) anomaly detection structure according to the present invention is technically unique and cannot be derived from any of the prior art systems.

Figure 15:
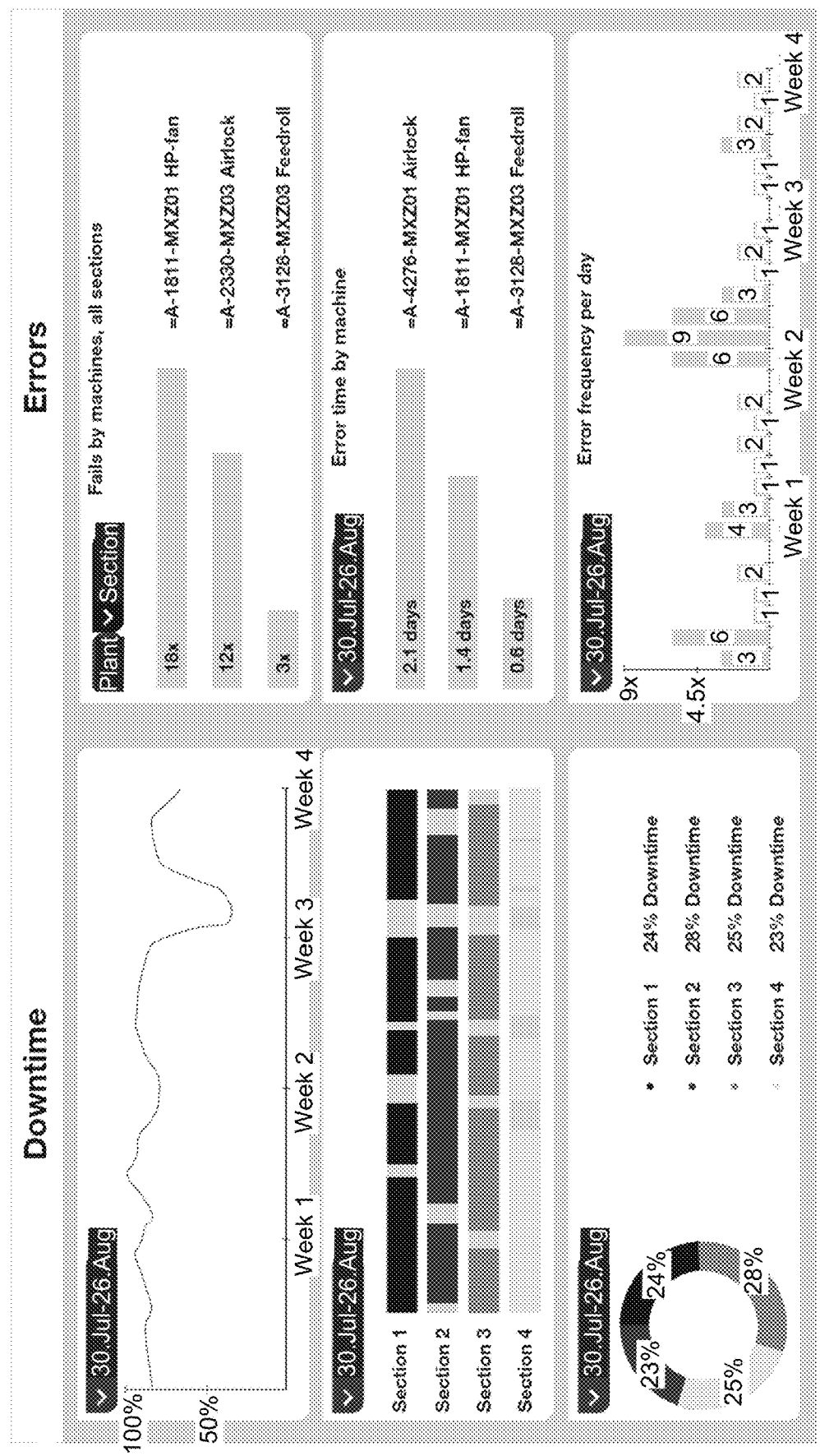

FIG. 15 shows other diagrams schematically illustrating the anomaly detection of process data based on downtime and error sensory data, where the left column shows downtime measurements within the various sections over time, and the right column shows in the upper diagram the measured fails by machine over all machines, the middle diagram the error time by machine and the lower diagram the error frequency measured by day.

FIG. 16 shows another diagram schematically illustrating the error/fault correlation in the sensory and measuring data for the example shown in FIG. 15. FIG. 16 illustrates, how the inventive system and method for detecting anomalies or early indications of equipment failure in industrial equipment or production plants triggering sensory or measuring data originating from components used in industrial processes allows providing appropriate steering signals based on the detected and measured alarms frequencies, and correlations, and anomalies. Thus, the inventive system allows a technically completely new way of triggering correlations between alarm events, and/or visualizing of alarm events in time, and/or anomaly detection of abnormal downtime/alarms, and/or alarm playback and corresponding electronic signaling generation.

LIST OF REFERENCES

1 Industrial equipment/production plants
   11 Process line
   12 Plant downtime
   13 Monitoring devices
   14 Control/steering devices
   15 Alarm devices
2 Measuring devices/sensors
3 Equal sized time frames
   31 Anomalous time frames
4 Measuring and/or process parameters
   41 Sensory/measuring parameters
   42 Process variables
   43 Anomalous sensor data values
5 Industrial processing components/industrial devices
6 Industrial process
   61 Occurring alarm events
      611 Frequencies of occurring alarm events
      612 Frequency patterns of occurring alarm events
7 System for detecting anomalies or early indications of equipment failure in industrial equipment or production plants
   71 Monitoring device
8 Machine learning module
   81 Multi-dimensional data structure
      811, 812, . . . , $81x$ Variable hidden Markov model parameter values
      821, 822, . . . , $82x$ Storable Markov chain states
      831, 832, . . . , $83x$ Trained model parameters
   82 Normal state frequency of occurring alarm events
   83 Probability state values 84 Logarithmic threshold value
  841 Anomaly score
85 Logarithmic result value
86 Predefined convergence threshold
9 Binary converter/differentiator
  91 Binary processing codes
    911 Generated binary processing codes
    912 Presampled binary processing codes
  92 Threshold values

The invention claimed is:

1. A method for detecting anomalies or early indications of equipment failure in industrial equipment or production plants by monitoring measuring data and/or process parameters originating from components used in an industrial process, the method comprising:
  measuring and/or monitoring the measuring data by monitoring the process parameters of components used in the industrial process by measuring devices or sensors and identifying equal sized time frames in the measuring and/or process parameters for time frames where the components used in the industrial process are functioning normally, the measuring and/or process parameters comprising parameter values for a plurality of measuring/sensory parameters and/or process variables;
  converting, using circuitry, the parameter values of the plurality of measuring/sensory parameters and/or process variables into observable binary processing codes for each of the identified, equal-sized time frames and assigning the binary processing codes to a sequence of storable Markov chain states;
  generating, using the circuitry, a multi-dimensional data structure comprising a definable number of variable hidden Markov model parameter values, wherein the variable model parameters of the multi-dimensional data structure are determined by a machine-learning module implemented in the circuitry applied to the sequence of the storable Markov chain states with assigned binary processing codes, and wherein the variable hidden Markov model parameters of the multi-dimensional data structure are varied and trained by learning a normal state frequency of occurring alarm events based on the measuring data and/or the process parameters of the identified, equal-sized time frames;
  initializing and storing, using the circuitry, a plurality of probability state values by applying the trained multi-dimensional data structure with the variable hidden Markov model parameter values to presampled binary processing codes having a same equal-sized time frame as the parameter values of the plurality of measuring/sensory parameters and/or process variables;
  determining, using the circuitry, a logarithmic threshold value of an anomaly score by ordering logarithmic result values of the stored probability state values; and
  deploying, using the circuitry, said trained multi-dimensional data structure with the variable hidden Markov model parameter values to monitor newly measured respectively determined the measuring data and/or the process parameters from industrial equipment or plants using the threshold value of the anomaly score to detect anomalous sensor data values that could be indicative of an impending system failure, wherein, for triggering at the anomalous sensor data values, a logarithmic result value of the probability state value of the newly measured respectively determined measuring data and/or process parameters is generated and compared to the stored probability state values based on said logarithmic threshold value of the anomaly score.

2. The method for detecting anomalies or early indications of equipment failure in industrial equipment or production plants according to claim 1, wherein
  the binary processing codes are generated based on threshold values applied to the measuring data and/or the process parameters.

3. The method for detecting anomalies or early indications of equipment failure in industrial equipment or production plants according to claim 2, wherein
  for the anomaly detection having too many anomaly events due to oscillating/noisy signals, the sensitivity for detecting an event is automatically tuned based on dynamic adjustments of one of the threshold values, and wherein
  where the threshold s exceeded, events are taken as a 1-value (true) and as a 0-value (false), otherwise, to generate a binary sequence.

4. The method for detecting anomalies or early indications of equipment failure in industrial systems according to claim 1, wherein anomalous time frames are measured across many assets of same industrial process lines, wherein for triggering at the anomaly score the anomalous time frames are applied to root cause analysis of plant downtime and maintenance service signaling is generated based on said root cause analysis of plant downtime.

5. The method for detecting anomalies or early indications of equipment failure in industrial equipment or production plants according to claim 1, wherein the machine-learning module processes the sequence of the assigned binary processing codes by applying a maximum likelihood parameter estimation for the training of the multi-dimensional data structure with the variable hidden Markov model parameters, wherein the elements of the sequence of storable parameter states of the Markov chain are assumed to be independent measurements of each other and wherein the model parameters of the multi-dimensional data structure are varied by maximizing the multiplied product of the probabilities in order to obtain the trained model parameters of the multi-dimensional data structure.

6. The method for detecting anomalies or early indications of equipment failure in industrial equipment or production plants according to claim 5, wherein the model parameters of the multi-dimensional data structure are iteratively varied until a predefined convergence threshold is exceeded.

7. The method for detecting anomalies or early indications of equipment failure in industrial equipment or production plants according to claim 1, wherein for determining said threshold value of the anomaly score, an averaging process is applied based on the different frequencies of occurring alarm events of the measuring and/or process parameters of the identified time frames.

8. The method for detecting anomalies or early indications of equipment failure in industrial equipment or production plants according to claim 1, wherein for determining said threshold value of the anomaly score, a frequency pattern is generated for each of the equal-sized, identified time frames using a pattern recognition to initialize a plurality of Markov chain sequences of storable parameter states,
  wherein each storable parameter state is a function of the plurality of the measuring data and/or the process parameters, and
  wherein, by the applied pattern recognition, weighting factors and/or mean and/or variance of each of the plurality of sequences of storable parameter states are determined, and time frames that are not relevant are removed from the used set of equal-sized, identified time frames.

9. The method for detecting anomalies or early indications of equipment failure in industrial equipment or production plants according to claim 1, wherein a gating signal, as a digital signal or pulse, is generated providing an appropriate time window,
   wherein an occurring anomalous time frame of newly measured measuring data and/or process parameters from among the many measured time frames of the measuring data and/or the process parameters are selected and normal time frames will be eliminated or discarded, and
   wherein the selection of an occurring anomalous time frame triggers the appropriate signaling generation and transition to assigned alarm and/or monitoring and/or control/steering circuitry.

10. The method for detecting anomalies or early indications of equipment failure in industrial equipment or production plants according to claim 9, wherein electronic control and steering signaling is generated,
    wherein, based on the detected occurring, anomalous time frame of newly measured measuring data from among the many measured time frames of measuring data are selected and normal time frames are eliminated or discarded, and
    wherein the selection of at least one occurring anomalous time frame triggers the appropriate signaling generation and transition to adjust the operation of the industrial equipment and/or production plants or a component by a control/steering circuitry.

11. A system for detecting anomalies or early indications of equipment failure in industrial equipment or production plants by monitoring measuring data and/or process parameters originating from components used in industrial processes, the system comprising:
    sensors or measuring devices for measuring the measuring data and/or the process parameters of components used in an industrial process and detection devices for identifying equal sized time frames in the measuring data and/or the process parameters for time frames where the components used in the industrial process are functioning normally, the measuring data and/or the process parameters comprising parameter values for a plurality of measuring/sensory parameters and/or process variables; and
    circuitry configured to implement
    a differentiator for converting the parameter values of the plurality of measuring/sensory parameters and/or process variables into observable binary processing codes for each of the identified, equal-sized time frames and assigning the binary processing codes to a sequence of storable Markov chain states; and
    a machine learning module for generating a multi-dimensional data structure comprising a definable number of variable hidden Markov model parameter values, wherein the variable model parameters of the multi-dimensional data structure are determined by the machine-learning module applied to the sequence of the storable Markov chain states with assigned binary processing codes, and wherein the variable hidden Markov model parameters of the multi-dimensional data structure are varied and trained by learning a normal state frequency of occurring alarm events based on the measuring data and/or the process parameters of the identified, equal-sized time frames,
    wherein the machine-learning module is configured for initializing and storing a plurality of probability state values by applying the trained multi-dimensional data structure with the variable hidden Markov model parameter values to presampled binary processing codes having a same equal-sized time frame as the parameter values of the plurality of measuring/sensory parameters and/or process variables,
    wherein the machine-learning module is configured for determining a logarithmic threshold value of an anomaly score by ordering logarithmic result values of the stored probability state values, and
    wherein the machine-learning module is configured for deploying said trained multi-dimensional data structure with the variable hidden Markov model parameter values to monitor newly measured respectively determined measuring data and/or process parameters from industrial equipment or plants using the threshold value of the anomaly score to detect anomalous sensor data values that could be indicative of an impending system failure, wherein, for triggering anomalous sensor data values, a logarithmic result value of the probability state value of a newly measured measuring and/or process parameters is generated and compared to the stored probability state values based on said logarithmic threshold value of the anomaly score.

\* \* \* \* \*